(12) United States Patent
Wang et al.

(10) Patent No.: US 9,515,889 B2
(45) Date of Patent: Dec. 6, 2016

(54) GEOGRAPHIC LOCATION SYSTEM AND METHOD

(75) Inventors: Yong Wang, Henan (CN); Daniel Burgener, Belleville, MI (US); Marcel Flores, Tucson, AZ (US); Aleksandar Kuzmanovic, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 462 days.

(21) Appl. No.: 13/096,773

(22) Filed: Apr. 28, 2011

(65) Prior Publication Data

US 2011/0282988 A1    Nov. 17, 2011

Related U.S. Application Data

(60) Provisional application No. 61/334,479, filed on May 13, 2010, provisional application No. 61/468,951, filed on Mar. 29, 2011.

(51) Int. Cl.
  *H04L 12/24* (2006.01)
  *H04L 12/26* (2006.01)
(52) U.S. Cl.
  CPC ........... *H04L 41/12* (2013.01); *H04L 43/0852* (2013.01)
(58) Field of Classification Search
  CPC .......................... H04L 43/0852; H04L 41/12
  USPC ....................................................... 709/224
  See application file for complete search history.

(56) References Cited

U.S. PATENT DOCUMENTS

| | | | |
|---|---|---|---|
| 6,826,172 B1 * | 11/2004 | Augart | 370/351 |
| 6,947,978 B2 | 9/2005 | Huffman et al. | |
| 7,039,689 B2 * | 5/2006 | Martija et al. | 709/220 |
| 8,254,264 B1 * | 8/2012 | Banerjee et al. | 370/238 |
| 2002/0169857 A1 * | 11/2002 | Martija et al. | 709/220 |
| 2003/0046022 A1 * | 3/2003 | Silverman | 702/150 |
| 2005/0135257 A1 | 6/2005 | Stephens et al. | |
| 2005/0168380 A1 * | 8/2005 | Xu et al. | 342/126 |
| 2008/0037536 A1 * | 2/2008 | Padmanabhan et al. | 370/389 |
| 2010/0153540 A1 * | 6/2010 | Li et al. | 709/224 |

(Continued)

OTHER PUBLICATIONS

Mohamed A. Khamsi, An Introduction to Metric Spaces and Fixed Point Theory, Mar. 20, 2001, John Wiley & Sons, p. 7-9.*

(Continued)

*Primary Examiner* — Anthony Mejia
*Assistant Examiner* — Joseph M Cousins
(74) *Attorney, Agent, or Firm* — Klintworth & Rozenblat IP LLC

(57) ABSTRACT

A method for determining a derived geographic location of a target Internet host includes identifying plural landmark Internet hosts communicatively coupled with the target Internet host by a network. The method also includes measuring network latencies of probe packets transmitted to the target and landmark Internet hosts along different network pathways and calculating relative distances between the target Internet host and one or more of the landmark Internet hosts based on the network latencies. The method further includes comparing the relative distances to identify at least one of the landmark Internet hosts that is geographically closer to the target Internet host than one or more other landmark Internet hosts and determining the derived geographic location of the target Internet host based on a geographic location of the at least one of the landmark Internet hosts that is geographically closer to the target Internet host.

2 Claims, 10 Drawing Sheets

(56) References Cited

U.S. PATENT DOCUMENTS

2010/0153552 A1* 6/2010 Parekh et al. .............. 709/225
2011/0072262 A1* 3/2011 Amir et al. .................. 713/168
2011/0099550 A1* 4/2011 Shafi ........................... 718/102

OTHER PUBLICATIONS

E. Bassett, Towards IP Geolation Using Delay and Topology Measurements, Oct. 27, 2006, IMC'06, p. 1-13.*
Muir et al., Internet Geolocation and Evasion, Carleton University School of Computer Science, Apr. 8, 2006, p. 1-26.*
Kurose et al., Computer Networking (excerpt), 2013, 2010, 2008, Pearson, Sixth edition, p. 331-380.*
Rahul Jain, et al, Geographical Routing Using Partial Information for Wireless Ad Hoc Networks, 2001, IEEE Personal Communication p. 48-58.*
ISR and W/O of PCT/US2011/034360 dated Nov. 13, 2012.
City data. http://www.city-data.com/.
Davis, C., Vixie, P., Goodwin, T., and Dickinson, I. A means for expressing location information in the domain name system. *RFC 1876* (1996).
Geolocation and application delivery. www.f5.com/pdf/white-papers/geolocation-wp.pdf.
Geolocation api specification. http://dev.w3.org/geo/api/spec-source.html.
Geonames. http://www.geonames.org/.
Google maps with my location. http://www.google.com/mobile/gmm/mylocation/index.html.
How google maps uses the w3c geolocation api and google location services. <http: //apb.directionsmag.com/archives/6094-How-Google-Maps-uses-the-W3C-Geolocation/-API-and-Google-Location-Services.html>.
International Search Report and Written Opinion for PCT/US11/34360 date Jul. 8, 2011.
Ooakla's speedtest throughput measures. http://silicondetector.org/display/IEPM/Ookla%27s+Speedtest+Throughput+Measures.
Reverse ip domain check. http://www.yougetsignal.com/tools/web-sites-on-web-server/.
Skyhook. http://www.skyhookwireless.com/.
Technical report. <http://networks.cs.northwestern.edu/technicalreport.pdf>.
Dischinger, M., Haeberlen, A., Gummadi, K. P., and Saroiu, S. Characterizing residential broadband networks. In *IMC*, '07.
Freedman, M. J., Vutukuru, M., Feamster, N., and Balakrishnan, H. Geographic locality of ip prefixes. In *IMC*,'05.
Gueye, B., Ziviani, A., Crovella, M., and Fdida, S. Constraint-based geolocation of Internet hosts. *Transactions on Networking* (2006).
Guo, C., Liu, Y., Shen, W., Wang, H. J., Yu, Q., and Zhang, Y. Mining the web and the internet for accurate ip address geolocations. In *Infocom mini conference*, '09.
Katzbassett, E., John, J. P., Krishnamurthy, A., Wetherall, D., Anderson, T., and Yatin. Towards ip geolocation using delay and topology measurements. In *IMC*.
Moore, D., Periakaruppan, R., Donohoe, J., and Claffy, K. Where in the world is netgeo.caida.org? In *INET'00*.
Padmanabhan, V. N., and Subramanian, L. An investigation of geographic mapping techniques for internet host. In *ACM SIGCOMM* '01.
Percacci, R., and Vespignani, A. Scale-free behavior of the internet global performance. *The European Physical Journal B—Condensed Matter* (2003).
Siwpersad, S., Bambagueye, and Uhlig, S. Assessing the geographic resolution of exhaustive tabulation for geolocating internet hosts. In *PAM*, '08.
Valancius, V., Laoutaris, N., Massoulie, L., Diot, C., and Rodriguez, P. Greening the Internet with nano data centers. In *CONEXT* '09.
Vincenty, T. Direct and inverse solutions of geodesics on the ellipsoid with application of nested equations. *Survey Review* (1975).
Wong, B., Stoyanov, I., and Sirer, E. G. Octant: A comprehensive framework for the geolocalization of internet hosts. In *NSDI*, '07.
Zhang, M., Ruan, Y., Pai, V., and Rexford, J. How dns misnaming distorts internet topology mapping. In *USENIX Annual Technical Conference*, '06.
Ziviani, A., Fdida, S., De Rezende, J. F., and Duarte, O. C. M. Improving the accuracy of measurement-based geographic location of internet hosts. *Computer Networks, Elsevier Science* (2005).
B. Gueye, S. Uhlig, A., Ziviani, and S. Fdida. Leveraging buffering delay estimation for geolocation of internet hosts. In IFIP Networking Conference, '06.
B. Wong, A. Slivkins, and E.G. Sirer. Meridian: A lightweight network location service without virtual coordinates. In ACM SIGCOMM '05.
Bing maps. http://www.bing.com/maps/.
D. Clark, C. Partridge, R. Braden, B. Davie, S. Floyd, V. Jacobson, D. Katabi, G. Minshalll, K.K. Ramakrishnan, T. Roscoe, I. Stoica, J. Wroclawski and L. Zhang. Making the world (of communications) a different place. ACM Computer Comm. Review, 2005.
F. Dabek, R. Cox, F. Kaashoek, and R. Morris. Vivaldi: A decentralized network coordinate system. In SIGCOMM, '04.
Padmanabhan et al., "An Investigation of Geographic Mapping Techniques for Internet Hosts," Computer Communication Review, ACM, New York, NY, US, vol. 31, No. 4, Oct. 1, 2001, pp. 173-185, XP001115755, ISSN: 0146-4833, DOI: 10.1145/964723.383073, Abstract, Section 1, Introduction, Section 5.1, Correlation between Network Delay and Geographic Distance, Section 5.2 Nearest Neighbor in Delay Space (NNDS).
Supplementary European Search Report, Communication for Application No. 11781021.8-1862 / 2569871, dated Oct. 2, 2013, 9 pages.
Guohui Wang, et al., Towards Network Triangle Inequality Violation Aware Distributed Systems, Oct. 24-26, 2007, pp. 1-13.
Yifei Zhang, et al., Triangulation Inequality Violation in Internet Delay Space, D. Jin and S. Lin (Eds.): Advances in CSIE, vol. 2, AISC 169, 2012, pp. 331-337.

* cited by examiner

GEOGRAPHIC LOCATION SYSTEM AND METHOD

CROSS-REFERENCE TO RELATED APPLICATIONS

This application claims priority to U.S. Provisional Patent Application Ser. No. 61/334,479, which was filed on May 13, 2010, and is entitled "A Method For Accurately Determining The Geographic Location Of An Internet Host" (the "'479 Application"), and to U.S. Provisional Patent Application Ser. No. 61/468,951, which was filed on Mar. 29, 2011, and is entitled "Towards Street-Level Client-Independent IP Location" (the "'951 Application"). The entire disclosures of the '479 Application and the '951 Application are incorporated by reference herein.

BACKGROUND OF THE INVENTION

Determining a geographic location of an Internet host can be valuable for a number of Internet applications. For example, knowing the geographic location or approximate geographic location of the host can simplify network management in large-scale systems, assist with network diagnoses, and enable location-based advertising services. An Internet host can include one or more computers, such as servers, that provide a service, such as hosting a website, an email service, and the like. Some known systems and methods can provide coarse-grained geolocation of an Internet host, such as at the state- or city-level. However, such coarse-grained geolocation may be insufficient in a number of contexts, such as identifying Internet hosts in need of repair, identifying businesses in a relatively densely populated area, and the like.

Some known systems and methods are client-assisted in that the Internet hosts themselves (or the entities managing the hosts) voluntarily provide the geographic locations of the hosts. However, many applications that make use of geolocation services, such as location-based access restrictions, context-aware security, and online advertising, may be unable to rely on the voluntary support for geolocation from the clients. For example, not all clients may be willing to disclose the locations of their Internet hosts.

Other known systems and methods make use of online databases, such as the Whois database, that provide information on the IP addresses of Internet hosts and registered locations of the hosts. However, some relatively large commercial entities having hosts that are widely dispersed in different locations can register the domain names of the hosts with the same geographical location, such as the postal address of the headquarters of the entity. As a result, mining the Whois database may only yield the location of the headquarters for a host, as opposed to the actual geographic location of the hosts.

A need exists for a system and method that can determine a location or approximate location of an Internet host that is at least as accurate or more accurate than known systems and methods and/or is able to identify the location or approximate location without having access to or control over the Internet host.

BRIEF DESCRIPTION OF THE INVENTION

At least one embodiment described herein provides a method for determining a derived geographic location of a target Internet host. The method includes identifying a plurality of landmark Internet hosts communicatively coupled with each other and with the target Internet host by a packet-switched network. The method also includes measuring network latencies of probe packets transmitted to the target Internet host and to each of the plurality of landmark Internet hosts along different network pathways in the network and calculating relative distances between the target Internet host and one or more of the landmark Internet hosts based on the network latencies. The method further includes comparing the relative distances to identify at least one of the landmark Internet hosts that is geographically closer to the target Internet host than one or more other landmark Internet hosts and determining the derived geographic location of the target Internet host based on a geographic location of the at least one of the landmark Internet hosts that is geographically closer to the target Internet host.

In another embodiment, a geographic location system includes a geolocation module, a distance calculation module, and a landmark identification module. The geolocation module is configured to identify a plurality of landmark Internet hosts communicatively coupled with each other and with the target Internet host by a packet-switched network. The distance calculation module is configured to measure network latencies of probe packets transmitted to the target Internet host and to each of the plurality of landmark Internet hosts along different network pathways in the network. The distance calculation module also is configured to calculate relative distances between the target Internet host and one or more of the landmark Internet hosts based on the network latencies. The landmark identification module is configured to compare the relative distances to identify at least one of the landmark Internet hosts that is geographically closer to the target Internet host than one or more other landmark Internet hosts. The geolocation module also is configured to determine a derived geographic location of the target Internet host based on a geographic location of the at least one of the landmark Internet hosts that is geographically closer to the target Internet host.

In another embodiment, a computer readable storage medium for a geographic location system having a processor is provided. The medium includes one or more sets of instructions that direct the processor to identify a plurality of landmark Internet hosts communicatively coupled with each other and with the target Internet host by a packet-switched network. The sets of instructions also direct the processor to measure network latencies of probe packets transmitted to the target Internet host and to each of the plurality of landmark Internet hosts along different network pathways in the network. The sets of instructions also direct the processor to calculate relative distances between the target Internet host and one or more of the landmark Internet hosts based on the network latencies. The sets of instructions further direct the processor to compare the relative distances to identify at least one of the landmark Internet hosts that is geographically closer to the target Internet host than one or more other landmark Internet hosts. The sets of instructions direct the processor to determine a derived geographic location of the target Internet host based on a geographic location of the at least one of the landmark Internet hosts that is geographically closer to the target Internet host.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
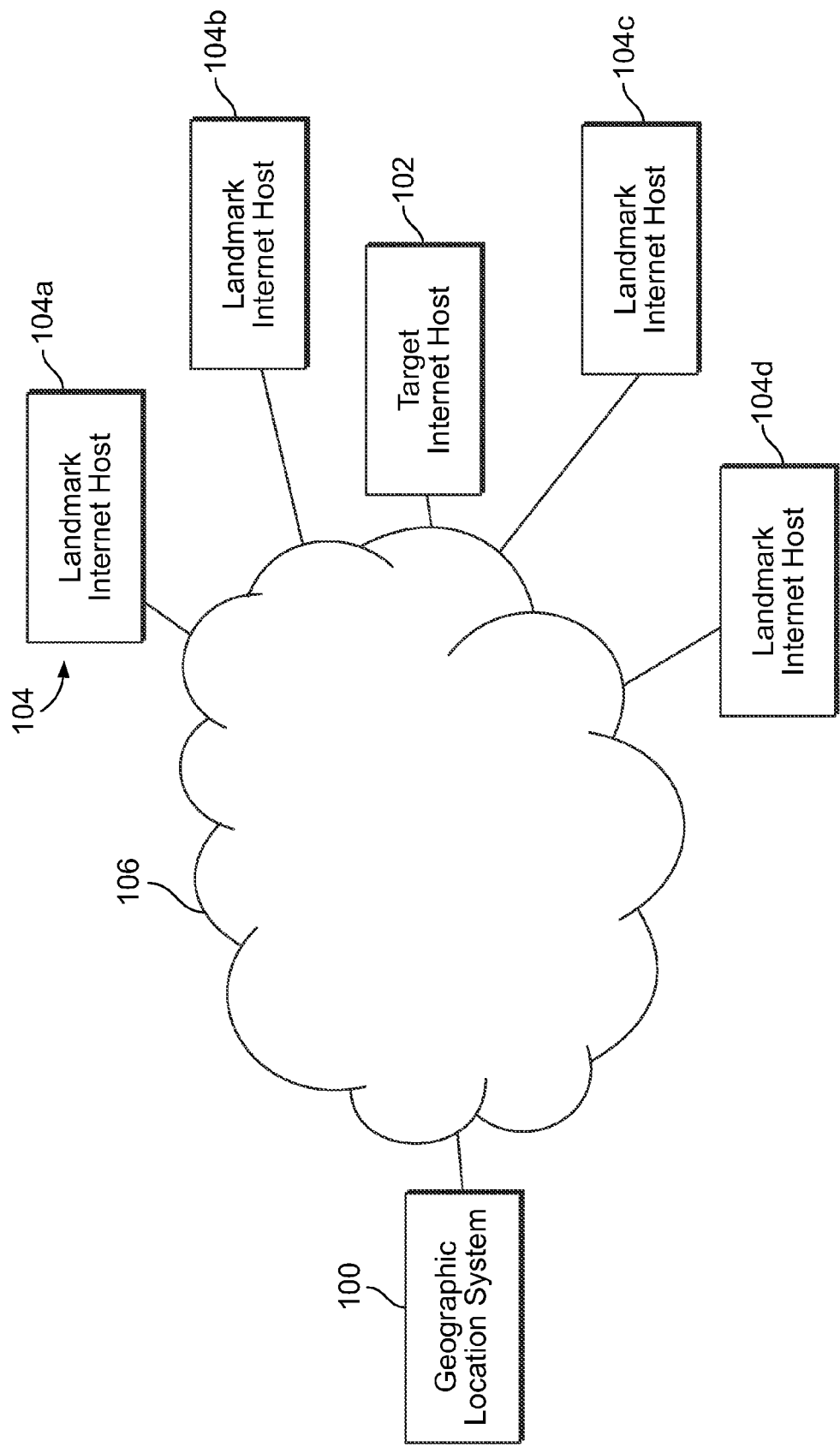
FIG. 1 is a diagram of one embodiment of a geographic location system.

In accordance with one or more embodiments described herein, a geographic location system and method is provided that determines a derived geographic location of a target Internet host based on the geographic locations of one or more landmark Internet host. The term "Internet host" includes one or more computers, such as one or more servers, that host a website, an email service, a social network, or other computer-based service, of an entity, such as a business, government office, university, school, person, or the like. The Internet hosts may have one or more associated Internet Protocol (IP) addresses and/or domain names. As used herein, the term "computer" may mean a single, stand-alone personal computer, a plurality of interconnected computers or processors, one or more servers, and the like. For example, an Internet host may include a server of a business that hosts a website for the business.

A target Internet host can be associated with an entity, such as a business, government office, school, university, and the like, having a geographic location that may be unknown or uncertain and is sought to be found using one or more embodiments described herein. A landmark Internet host can be associated with an entity having an IP address and/or domain name and a fixed and/or known geographic location. For example, servers that host the website of a business or any other entity, email exchange servers, personal computers, Digital Subscriber Line (DSL) or cable home routers or modems of individuals, and the like, having geographic locations that are relatively stable (e.g., do not change frequently) may be used as landmark Internet hosts. Alternatively, one or more of the target Internet host and/or the landmark Internet hosts may not be associated with an entity.

A user can employ the system to determine a derived geographic location of the target Internet host (e.g., the postal address and/or proximity to a current position of the user). In one embodiment, the system and method determine the derived geographic location of the target Internet host without having prior knowledge of the postal address of the target Internet host, without having administrative access to the computers of the target Internet host, without receiving an actual geographic location of the target Internet host from a third party (e.g., the entity that owns or controls the target Internet host), and/or without illicitly acquiring access to the computers of the target Internet host (e.g., "hacking" into the computers). For example, the landmark Internet hosts that are used to determine the derived geographic location of the target Internet host may be "passive devices," such as devices that are not controllable by the user or by the geolocation system.

At least one technical effect of various embodiments of the systems and methods described herein includes automatically providing a person with an accurate determination of a location of a business, school, government office, and the like, without the person or the automated system having access or control over nodes (e.g., routers, gateways, and the like) or Internet hosts that are used to determine the location. The location may be used for advertising purposes (e.g., to provide targeted advertising to the person), for navigational purposes (e.g., to more accurately direct the person to the location), and the like. The location that is determined by the systems and methods may be a more accurate location (e.g., closer to the actual geographic location of the business, school, or government office) than is currently available without having access or control over the Internet host of the business, school, government office, and the like. Another technical effect may be accurately determining an approximately location of an Internet host for diagnostic and/or repair purposes, for location-based access restrictions to the host, and/or for context-aware security.

FIG. 1 is a diagram of one embodiment of a geographic location system 100. The system 100 may include one or more computers that are logically interconnected to determine a derived geographic location of a target Internet host 102. The system 100 uses one or more landmark Internet hosts 104 to determine the derived geographic location of the target Internet host 102. The landmark Internet hosts 104 can represent computers that host websites, email services, social networks, or other services. The landmark Internet hosts 104 may be associated with geographic locations that can be referred to as "actual locations," "reported locations," and/or "verified locations." The actual location can represent the true geographic location (e.g., postal address) at which the landmark Internet host 104 is located. The reported location can represent a location associated with an entity (e.g., a business, school, government office, university, and the like) that has a service, such as a website or email exchange, that is hosted on the landmark Internet host 104. The verified location can represent a geographic location of a landmark Internet host 104 that has been confirmed as being an accurate actual location of the landmark Internet host 104. The landmark Internet hosts 104 are generally referred to by the reference number 104 and are individually referred to by the reference numbers 104A, 104B, 104C, and so on. While only four landmark Internet hosts 104 are shown, alternatively, there can be a different number of landmark Internet hosts 104. For example, a relatively large number of landmark Internet hosts 104 may be used by the system 100 (e.g., thousands, hundreds of thousands, millions, and the like).

The system 100, the target Internet host 102, and the landmark Internet hosts 104 are communicatively interconnected by one or more networks. In the diagram of FIG. 1, the networks that communicatively couple the system 100, the target Internet host 102, and the landmark Internet hosts 104 are illustrated as a single network 106. The network 106 can represent all or a portion of the Internet, one or more intranets, and/or other connected networks that provide for the communication of data between computers. For example, the network 106 can include one or more packet-switched networks having several nodes that communicate packets of data from a starting point (the transmitter of the data) to an ending point (the receiver of the data) along packet-switched network pathways that extend through several nodes. The nodes may hand-off, or transmit, data packets between each other along the network pathways. The term "node" can include an electronic component that receives a data packet and transmits the data packet to another electronic component along the network pathway so that the data packet can be communicated from the source to the destination. Examples of nodes can include network adapters, switches, routers, gateways, other network nodes, and the like.

In one embodiment, the system 100 locates the target Internet host 102 by identifying a geographic area of interest that encompasses the geographic location of the target Internet host 102 and the geographic locations of one or more of the landmark Internet hosts 104. Once the area of interest is identified, the system 100 reduces the size of the area of interest by determining relative distances between the target Internet host 102 and one or more of the landmark Internet hosts 104. The "relative distance" may represent calculated geographic distances (e.g., linear distances in Euclidean space, great circle distances, orthodromic distances, and the like) and/or paths in Internet space (e.g., a shortest path in Internet space, such as the path having the smallest delay, or a shorter path than one or more other paths in Internet space) between each of the landmark Internet hosts 104 and the target Internet host 102 that are based on network latencies associated with transmitting data packets to the landmark Internet hosts 104 and the target Internet host 102, as described below. The relative distances may differ from the actual geographic distances (e.g., the "real-world" distances that can be physically measured) but can be proportional to the actual geographic distances. For example, a landmark Internet host 104B having a smaller relative distance to the target Internet host 102 than another landmark Internet host 104D may indicate that the landmark Internet host 104B is geographically closer to the target Internet host 102 even though the relative distance may not be equivalent to the actual geographic distance between the landmark Internet host 104 and the target Internet host 102.

As described below, the system 100 may calculate the relative distances between the target Internet host 102 and one or more of the landmark Internet hosts 104 by transmitting probe packets (e.g., data packets sent by a traceroute software application or tool) to the target Internet host 102 and the selected landmark Internet hosts 104. The system 100 determines network pathways traversed by the probe packets and associated network latencies and calculates the relative distances based on the network pathways and the network latencies. The system 100 can use the relative distances to determine which landmark Internet hosts 104 are disposed closer to the target Internet host 102.

The system 100 may further reduce the size of the area of interest to a reduced area of interest based on the landmark Internet hosts 104 that are disposed closer to the target Internet host 102. The system 100 can then determine additional relative distances between the target Internet host 102 and one or more of the landmark Internet hosts 104 disposed in the reduced area of interest. Based on the additional relative distances, the system 100 can identify one or more of the landmark Internet hosts 104 that are disposed closer to the target Internet host 102. In one embodiment, the system 100 may identify a landmark Internet host 104 that is closest to the target Internet host 102. The system 100 may use multiple landmark Internet hosts 104 or a single landmark Internet host 104. For example, the system 100 may determine the derived geographic location of the target Internet host 102 as being the geographic location of the at least one landmark Internet host 104 that is closer to the target Internet host 102 than one or more other landmark Internet hosts 104 or that is closer to the target Internet host 102. Alternatively, the system 100 may determine the derived geographic location of the target Internet host 102 as being the geographic location of the single landmark Internet host 104 that is closer to the target Internet host 102 than one or more other landmark Internet hosts 104 or that is closer to the target Internet host 102.

Figure 2A:
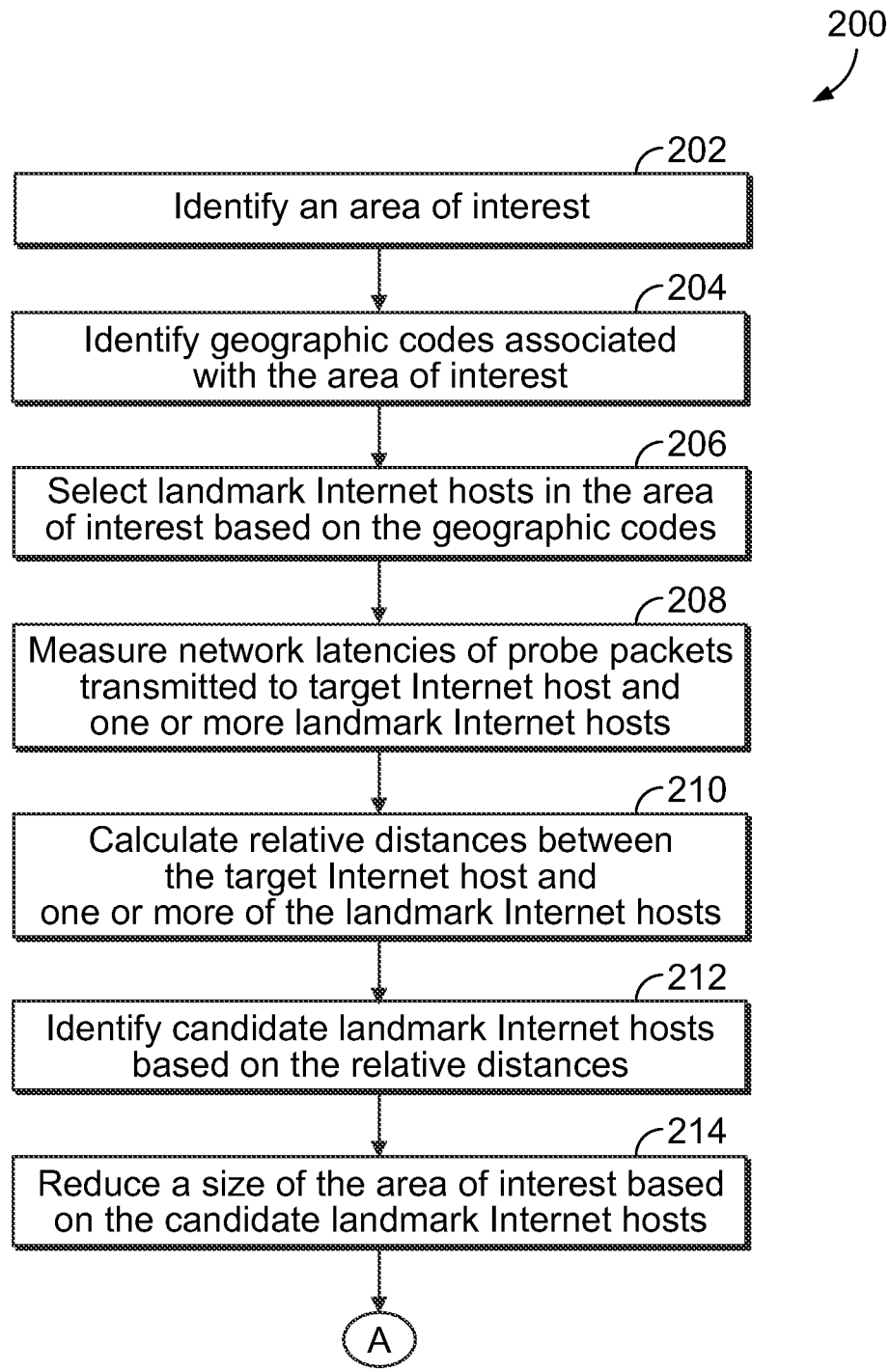
FIGS. 2A and 2B include a flowchart of one embodiment of a method for determining a derived geographic location of a target Internet host shown in FIG. 1.
Figure 2B:
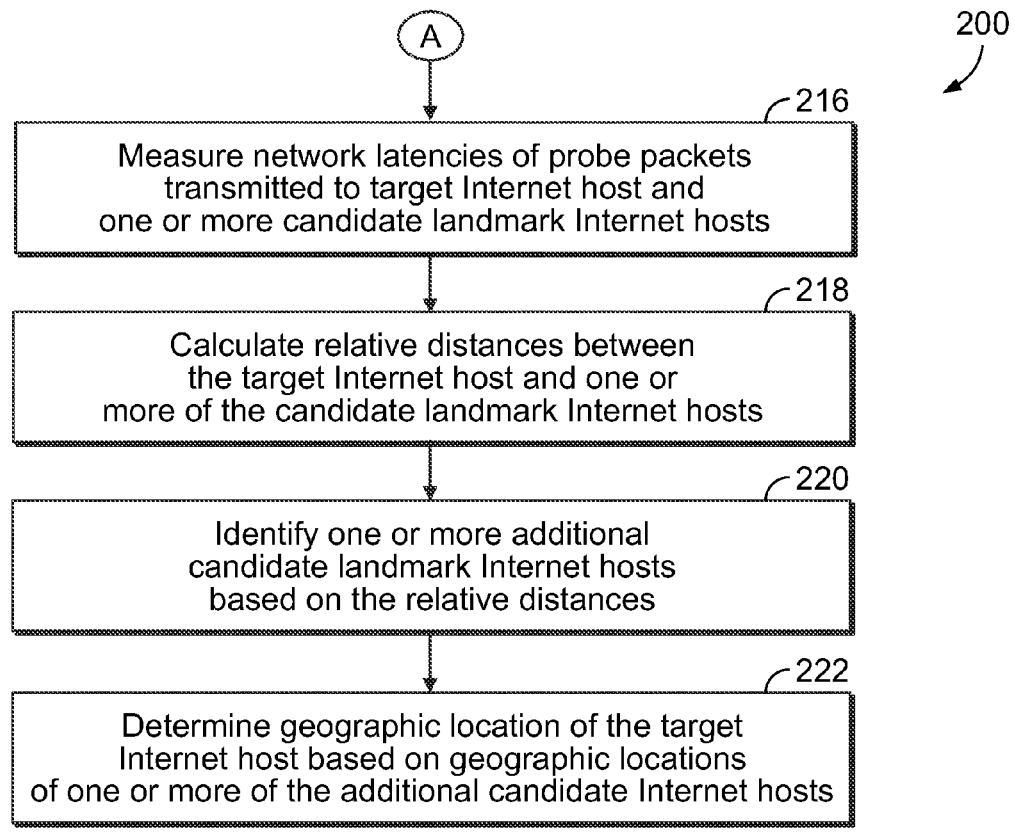

With continued reference to FIG. 1, FIGS. 2A and 2B include a flowchart of one embodiment of a method 200 for determining the derived geographic location of the target Internet host 102 (shown in FIG. 1). The derived geographic location of the target Internet host 102 may be a location that is relatively close to the target Internet host 102 (e.g., an "approximate" location of the target Internet host 102). For example, the derived geographic location that is determined by the method 200 may be within 2 kilometers (or 1.24 miles) of the actual location of the target Internet host 102. In another example, the derived geographic location that is determined by the method 200 may be within 690 meters (or 0.43 miles) of the actual location of the target Internet host 102. Alternatively, the derived geographic location may be within a different distance of the actual location of the target Internet host 102.

At 202, an area of interest is identified. The area of interest represents a geographic area, such as a section of the surface of the earth, that includes the actual geographic location of the target Internet host 102 (shown in FIG. 1). The area of interest can be identified based on network latencies of the network 106 (shown in FIG. 1). In one embodiment, the area of interest is identified by transmitting probe packets, such as data packets referred to as "pings," to the target Internet host 102 from a plurality of transmitting computers 302 (shown in FIG. 3), such as ping servers. The probe packets travel through the one or more nodes of the network 106 (shown in FIG. 1) to the target Internet host 102. One or more data packets (e.g., "response packets") may be sent from the target Internet host 102 in response to the transmitting computers 302. The time or delay that is associated with the probe packets and/or the response packets may be referred to as a "round-trip time" or "round-trip delay" of the probe packets. The round-trip time or delay can represent network latencies of network pathways in the network 106 that are traversed by the probe packets and/or the response packets.

The round-trip times or delays can be converted into calculated geographic distances. For example, a probe packet may travel through the network 106 (shown in FIG. 1) at an estimated speed. Based on the estimated speed and the round-trip time, a geographic distance can be calculated. In one embodiment, the speed of the probe packet is estimated to be between $4/9$ (or approximately 0.44) and $2/3$ (or approximately 0.67) of the speed of light ("c," or approximately 299,792,458 meters per second). Alternatively, a different fraction or percentage of the speed of light is used. The geographic distances of the paths traveled by the probe packets through the network 106 can be approximated based on the relationship:

$$D_P = K \times c \times t_{RT} \quad \text{(Equation \#1)}$$

where $D_P$ represents the calculated geographic distance between a transmitting computer 302 (shown in FIG. 3) that sends the probe packet and the target Internet host 102 (shown in FIG. 1), K represents a constant (such as 4/9, 2/3, or another fraction of the speed of light), c represents the speed of light, and $t_{RT}$ represents the network latency of the probe packet (e.g., the time required for the probe packet to reach the target Internet host 102). Alternatively, another relationship may be used, such as another product of time and a speed or velocity of data transmission.

Figure 3:
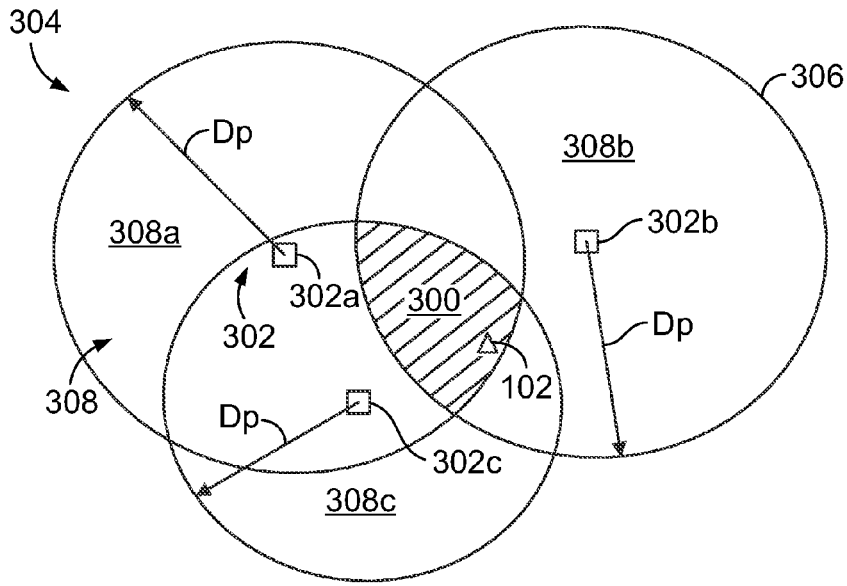
FIG. 3 illustrates one example of a map having an area of interest.

FIG. 3 illustrates one example of a map 304 having an area of interest 300. The map 304 shows locations of several transmitting computers 302 (e.g., ping servers) and an approximate location of the target Internet host 102. The transmitting computers 302 are generally referred to by the reference number 302 and are individually referred to by the reference numbers 302A, 302B, 302C. While only three transmitting computers 302 are shown, alternatively, a different number may be used.

In one embodiment, probe packets are sent from the transmitting computers 302 to the target Internet host 102 and the network latencies of the probe packets are measured. For example, the time period encompassed by transmission of the probe packet from a transmitting computer 302 to the target Internet host 102 can be measured and used to calculate the geographic distances ($D_P$) for each of a plurality of probe packets, such as by using Equation #1 above. Alternatively, the calculated geographic distances ($D_P$) may be determined in another manner.

Perimeters 306 are determined around the transmitting computers 302. As shown in FIG. 3, the perimeters 306 have circular shapes of a ring that encircles each transmitting computer 302. Each perimeter 306 encircles an area 308 surrounding the associated ping server 302. The areas 308 are generally referred to by the reference number 308 and individually referred to by the reference numbers 308A, 308B, 308C. The size of the perimeters 306 can be based on the calculated geographic distances ($D_P$). For example, the radius of each perimeter 306 may be the calculated geographic distance ($D_P$) associated with the corresponding transmitting computer 302. The perimeters 306 associated with different transmitting computers 302 may have different sizes due to different network latencies and geographic distances ($D_P$) calculated from the probe packets.

The area of interest 300 includes a section of the map 304 where a plurality of the areas 308 associated with the transmitting computers 302 overlap. For example, the area of interest 300 may encompass the geographic area where at least a predetermined number of the areas 308 of the transmitting computers 302 overlap. In one embodiment, the area of interest 300 may encompass the geographic area where all of the areas 308 overlap. Alternatively, the area of interest 300 may encompass the geographic area where all of the areas 308 overlap. While only one area of interest 300 is shown in FIG. 3, alternatively, several areas of interest 300 may be identified. For example, several transmitting computers 302 may have areas 308 that overlap in different regions of the map 304 to form several areas of interest 300. In another embodiment, only a single area of interest 300 is identified.

Figure 4:
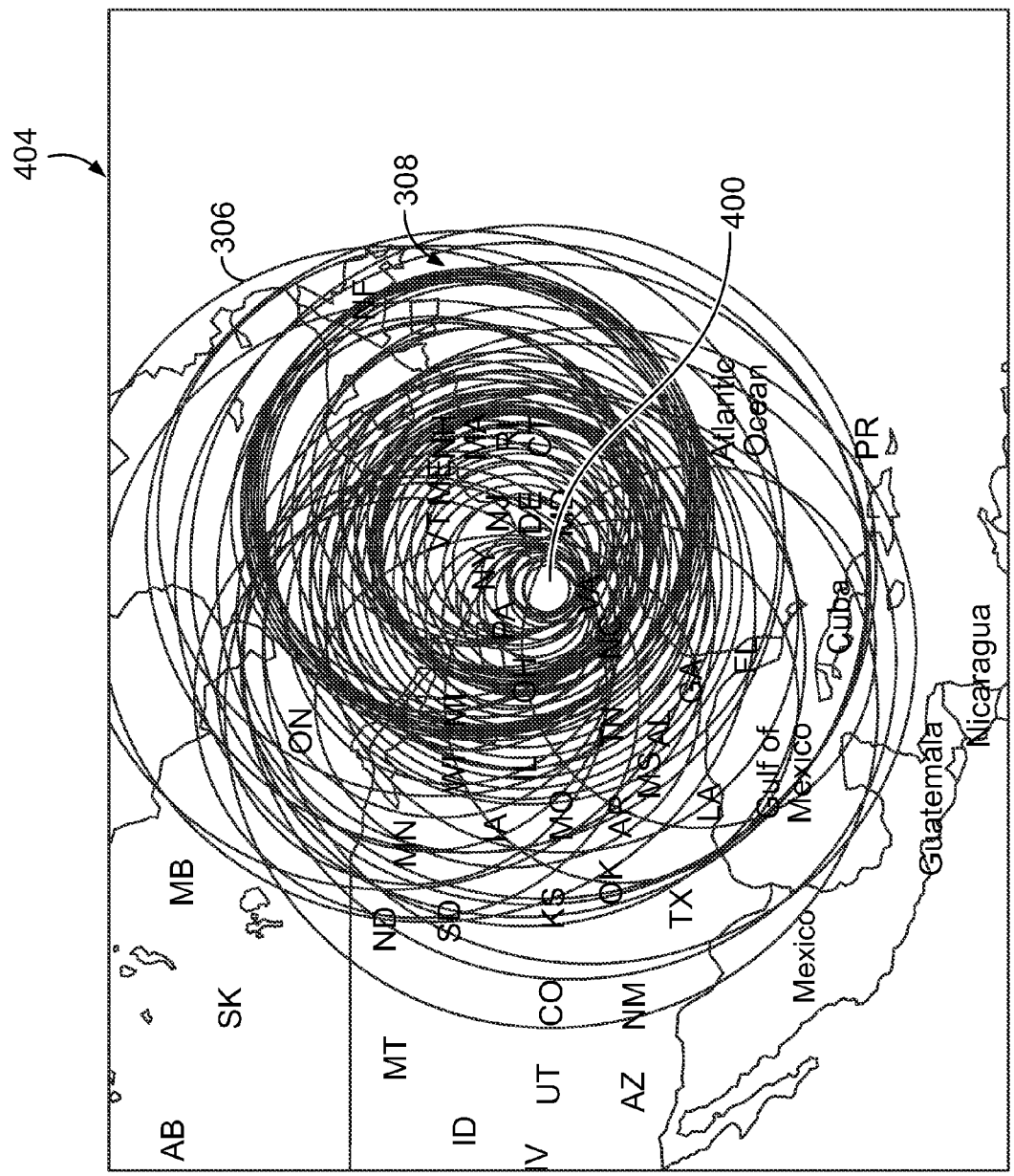
FIG. 4 illustrates another example of a map having an area of interest.

FIG. 4 illustrates another example of a map 404 having an area of interest 400. The map 404 shows many perimeters 306 surrounding overlapping areas 308 that are associated with different transmitting computers 302 (shown in FIG. 3) located around the eastern half of the United States. In the illustrated embodiment, the area of interest 400 includes the region near Washington, D.C., and is defined by the locations where all of the areas 308 overlap one another. Alternatively, the area of interest 400 may be defined by the locations where at least a predetermined number of areas 308 overlap one another.

In another embodiment, the area of interest 300, 400 may be identified in another manner that does not involve transmitting probe packets to the target Internet host 102 from transmitting computers 302. For example, the area of interest 300, 400 may be identified based on one or more geographic areas included in a database that associates the areas with IP addresses. Alternatively, another computational method may be used to determine the area of interest 300, 400.

Returning to the discussion of the method 200 shown in FIGS. 2A and 2B, at 204, one or more geographic-based codes associated with geographic areas or zones that are at least partially disposed within the area of interest are identified. A "geographic-based code" can include one or more alphanumeric codes representative of a geographic location, area, or zone. Examples of geographic-based codes include ZIP codes, telephone area codes, county names, city names, burrough names, neighborhood names, state names, and the like. For example, a set of geographic-based codes that are identified with different regions of a map, such as Zone Improvement Plan (ZIP) codes of the United States or other similar types of geographic codes used in another country, are determined. While the discussion herein focuses on ZIP codes, alternatively, other geographic-based codes may be used.

Figure 5:
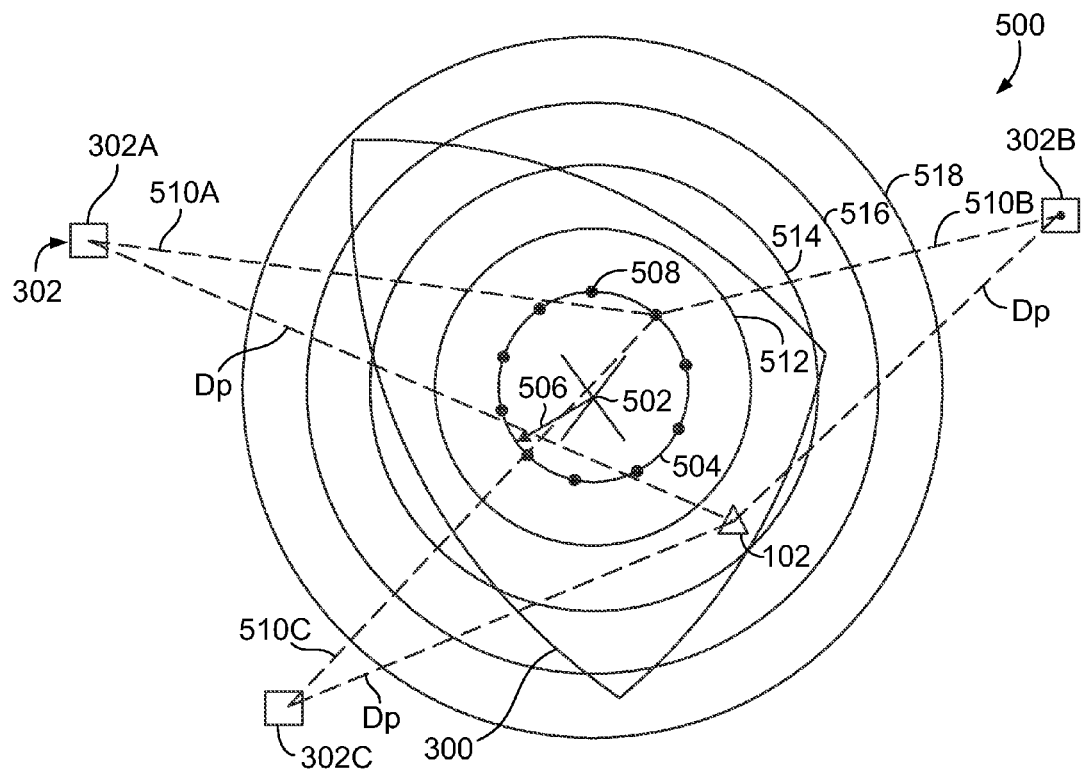
FIG. 5 is another map of the area of interest shown in FIG. 3 in accordance with one example.

FIG. 5 is a map 500 of the area of interest 300 in accordance with one example. In one embodiment, the set of geographic-based codes in the area of interest 300 is identified by determining a center point 502 of the area of interest 300. The center point 502 may be defined by longitude and latitude coordinates. The center point 502 can be approximated or measured by calculating a geometric centroid of the shape of the area of interest. Alternatively, another method may be used.

Once the center point 502 is identified, a first ring 504 is formed around the center point 502. While the first ring 504 has a circular shape in FIG. 5, alternatively, a different shape may be used. The first ring 504 may have a size that is predetermined. For example, the first ring 504 may have a radius 506 of 5 kilometers (or 3.1 miles). Alternatively, a different radius 506 may be used. Several sampling points 508 are formed on the first ring 504. In the illustrated embodiment, ten sampling points 508 are used. In another embodiment, a smaller or larger number of sampling points 508 may be used. The sampling points 508 can be evenly spaced or separated from each other along the first ring 504. The locations of the sampling points 508 are identified and may be used to verify that the sampling points 508 are located within the area of interest 300.

In one embodiment, a location of a sampling point 508 is examined to determine if the location is within the area of interest 300 by comparing distances 510 between the sampling point 508 and one or more of the ping servers 302 with the estimated geographic distances ($D_P$) between the ping servers 302 and the target Internet host 102. The estimated distance ($D_P$) and/or the distances 510 may be great-circle distances or orthodromic distances, such as distances between two points on the surface of a sphere. Alternatively, the estimated distance ($D_P$) and/or the distances 510 may be linear distances in Euclidean space. In another embodiment, the estimated distance ($D_P$) is the distance of a path in Internet space (e.g., a shortest path in Internet space, such as the path having the smallest delay, or a shorter path than one or more other paths in Internet space).

The distances 510 between the sampling points 508 and the ping servers 302 are generally referred to by the reference number 510 and are individually referred to by the reference numbers 510A, 510B, 510C, and so on.

The distances 510 of the sampling points 508 are compared with the estimated geographic distances ($D_P$) of the ping servers 302. If the distance 510 between the sampling point 508 and the ping server 302 is no larger than the estimated geographic distance ($D_P$) between the ping server 302 and the target Internet host 102, then the sampling point 508 can be verified as being located within the area of interest 300. On the other hand, if the distance 510 between the sampling point 508 and the ping server 302 is larger than the estimated geographic distance ($D_P$) between the ping server 302 and the target Internet host 102, then the sampling point 508 may not be verified as being located within the area of interest 300.

For example, with respect to the sampling point 508 associated with the distances 510A, 510B, 510C in FIG. 5, if the distance 510A is no larger than the estimated distance ($D_P$) between the ping server 302A and the target Internet host 102, if the distance 510B is no larger than the estimated distance ($D_P$) between the ping server 302B and the target Internet host 102, and if the distance 510C is no larger than the estimated distance ($D_P$) between the ping server 302C and the target Internet host 102, then the sampling point 508 may be verified as being located in the area of interest 300. Alternatively, if the distance 510A is larger than the estimated distance ($D_P$) between the ping server 302A and the target Internet host 102, if the distance 510B is larger than the estimated distance ($D_P$) between the ping server 302B and the target Internet host 102, or if the distance 510C is larger than the estimated distance ($D_P$) between the ping server 302C and the target Internet host 102, then the sampling point 508 may not be verified as being located in the area of interest 300.

A set of the sampling points 508 on the first ring 504 and located within the area of interest 300 may be identified based on the following criterion:

$$\text{dist}(u_i, v_i) \leq r_i \quad \text{(Equation \#2)}$$

where $u_i$ represents the $i^{th}$ sampling point 508, $v_i$ represents the $i^{th}$ ping server 302, $r_i$ represents the estimated distance ($D_P$) between the $i^{th}$ ping server 302 and the target Internet host 102, and $\text{dist}(u_i, v_i)$ represents a distance function that calculates the great-circle distance or orthodromic distance between the $i^{th}$ sampling point 508 and the $i^{th}$ ping server 302. The sampling points 508 that satisfy the above criterion can be included in the set as verified sampling points 508 that are located within the area of interest 300. The sampling points 508 that do not satisfy the above criterion may not be included in the set.

One or more additional rings 512, 514, 516, 518 may be formed around the center point 502 and the first ring 504. Each of the additional rings 512, 514, 516, 518 may be incrementally larger than the ring 504, 512, 514, 516, 518 disposed inside the ring. For example, the radius 506 of the second ring 512 may be 5 kilometers (or 3.1 miles) larger than the radius 506 of the first ring 504, the radius 506 of the third ring 514 may be 5 kilometers (or 3.1 miles) larger than the radius 506 of the second ring 512, and so on. Additional sampling points 508 are obtained along the additional rings 512, 514, 516, 518 and the distances 510 between the sampling points 508 and the transmitting computers 302 can be compared to the estimated distances ($D_P$) associated with the transmitting computers 302, as described above. The sampling points 508 having distances 510 from the transmitting computer 302 that are no larger than the estimated distances ($D_P$) associated with the same transmitting computer 302 are included in the set of sampling points 508. The addition of more rings 504, 512, 514, 516, 518 and sampling points 508 can continue until less than a predetermined number of sampling points 508 are verified as being located in the area of interest 300, as described above. For example, additional rings and sampling points may be created until a ring is created having no sampling points that are located within the area of interest 300.

In one embodiment, the geographic-based codes of the sampling points 508 are obtained. Longitude and latitude coordinates and/or geographic-based codes of the sampling points 508 may be determined and compared to a database, list, table, or other memory structure having geographic-based codes and associated ranges of longitude and latitude coordinates of the locations disposed within the different geographic-based codes. Such a database, list, table, or other memory structure may be stored on a memory 1204 (shown in FIG. 12) of the system 100 (shown in FIG. 1). Based on this comparison, a list of geographic-based codes in the area of interest is created.

Returning to the discussion of the method 200 shown in FIGS. 2A and 2B, at 206, one or more landmark Internet hosts 104 (shown in FIG. 1) located in the area of interest 300 (shown in FIG. 3) are selected based on the geographic codes. For example, a group of landmark Internet hosts 104 having associated geographic locations in the area of interest 300 are identified based on the geographic-based codes disposed in the area of interest 300.

In one embodiment, a predefined or preexisting database, list, table, or other memory structure stores several geographic-based codes and the landmark Internet hosts 104 having actual or verified locations in the geographic-based codes. Such a database, list, table, or other memory structure may be stored on a memory 1204 (shown in FIG. 12) of the system 100 (shown in FIG. 1). The landmark Internet hosts 104 may previously have been identified as being located in the geographic-based codes, as described below. The memory structure can be queried with the set of geographic-based codes in the area of interest 300 to obtain a list of the landmark Internet hosts 104 that are located in the areas of the geographic-based codes of the set.

In another embodiment, one or more of the landmark Internet hosts 104 (shown in FIG. 1) that are identified as being located within the area of interest 300 (shown in FIG. 3) may be determined by searching publicly available websites. For example, mapping websites or search engines such as Bing™ (www.bing.com/maps) or Google Maps™ (www.google.com/maps) may be queried to identify a geographic location of a landmark Internet host 104. As used herein, the term website includes online search engines. Alternatively, other, non-mapping Internet search engines or other websites may be used. Examples of such mapping and/or non-mapping search engines may include Google, Yahoo, Bing, Baidu, Ask, Alta Vista, Lycos, MetaCrawler, Dogpile, and the like.

In one embodiment, the landmark Internet hosts 104 may be identified from one or more aggregator websites. An aggregator website is a website that provides web domain names and/or corresponding geographic locations of the landmark Internet hosts 104 that host the domain names. Alternatively, an aggregator website may provide web domain names while the corresponding geographic locations of the landmark Internet hosts 104 may be obtained directly from the web domains available on the aggregator websites, such as by following hyperlinks on the aggregator website to the website of the landmark Internet host 104. Examples of aggregator websites include Yellowpages.com, Yell.com, Yellowbook.com, Expedia.com, and the like. In one embodiment, a GPS/POI (or Global Positioning System/Point of Interest) website may be used, such as downloads.cloudmade.com. In another embodiment, a Wi-Fi network directory may be used to identify the landmark Internet hosts 104. Such a directory can provide IP addresses and associated geographic locations of associated Wi-Fi networks. Examples of such directories can include wigle.net/gps/gps/Map/onlinemap2, www.wi-fihotspotlist.com/loc/5/2484585.php, www.wififreespot.com/fl.html, and hotspot.internode.on.net/coverage.

Individual entities (e.g., businesses, government offices, schools, universities, persons, and the like) similarly may voluntarily and/or on a commercial basis provide the domain names and/or static IP addresses of the computers that host their websites, email exchange servers, and/or used as personal computers and the geographic locations of the computers as the landmark Internet hosts 104. For example, online, mobile, and/or other traditional advertising (e.g., television, radio, billboard, newspaper, magazine, leaflet, and other types of advertisements) may be used to entice entities to voluntarily provide the domain names and/or IP addresses of potential landmark Internet hosts 104. The entities may manually enter the information into a website.

In some scenarios, both the domain name and the geographic location of a landmark Internet host 104 may not be available from a single source, such as a single search engine, website, aggregator website, GPS/POI website, directory, and the like. For example, a first website or a first directory may provide a domain name and/or IP address of the landmark Internet host 104 but not the geographic location of the landmark Internet host 104. A second website or a second directory that is different from the first website or the first directory may be queried to obtain the missing information, such as the geographic location of the landmark Internet host 104. Alternatively, the first website or the first directory may provide a geographic location of the landmark Internet host 104 but not the domain name or IP address of the landmark Internet host 104. The second website or the second directory that is different from the first website or the first directory may be queried to obtain the missing information, such as the domain name and/or IP address of the landmark Internet host 104.

Once the geographic-based codes in the area of interest 300 are determined, one or more websites (e.g., Bing™, Google™, another website, and the like) can be queried with the name of the entity associated with the landmark Internet host 104 and one or more of the geographic-based codes in the area of interest 300. For example, the query may search for a name of a business entity, government office, person, or the like, that associated with the landmark Internet host 104 and one or more geographic-based codes in the area of interest 300. In addition, the domain names and associated geographic locations may be obtained directly from one or more aggregator websites by downloading content from the aggregator websites. As described above, if either the geographic location or the domain name (or IP address) cannot be obtained from a first source (e.g., a first website or directory), a second source (e.g., a different website or directory) may be queried of content can be downloaded for the missing information. The search results or downloaded content from the websites may provide geographic addresses, such as a postal address, of the entity that are located in the geographic-based code. This geographic address can be associated with the landmark Internet host 104 as the landmark geographic location of the landmark Internet host 104. As described below, the geographic locations of the landmark Internet hosts 104 can be verified to ensure that the landmark Internet hosts 104 actually are located at the geographic locations obtained from the search results from a website. For example, after querying the search website for a postal address of an entity associated with the landmark Internet host 104 in a geographic-based code in the area of interest 300, the postal address can be examined to ensure that the landmark Internet host 104 is located at the postal address and is not remotely hosted at another location while being associated with the postal address.

At 208, network latencies of probe packets transmitted to the target Internet host 102 and one or more of the landmark Internet hosts 104 in the area of interest 300 are measured. In addition to measuring the network latencies associated with transmission of the probe packets, network pathways of the probe packets may be monitored. For example, probe packets, such as data packets sent by a traceroute software tool or program, may be transmitted from one or more computers located at one or more vantage points to the target Internet host 102 and one or more landmark Internet hosts 104 in the area of interest 300. The term "network pathway" refers to the path traversed by a probe packet from a source (e.g., a computer at a vantage point) to a destination (e.g., the target Internet host 102 or a landmark Internet host 104) via one or more nodes in the network 106. The network pathway may include a list of several nodes that receive and transmit the probe packet along the network pathway and a corresponding network latency, or time involved in transmitting the probe packet from one node to another node in the network 106.

Figure 6:
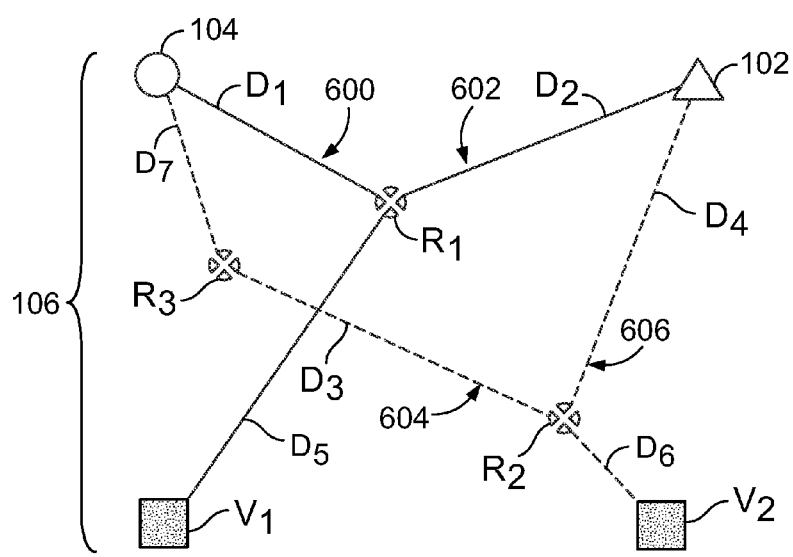
FIG. 6 is a diagram of one example of a plurality of packet-switched network pathways extending through a network shown in FIG. 1.

FIG. 6 is a diagram of one example of a plurality of packet-switched network pathways 600, 602, 604, 606 through the network 106. Only a portion of the network 106 may be shown in FIG. 6. Two vantage points ($V_1$, $V_2$) are disposed in the network 106 and may include computers that are referred to as traceroute servers. While two vantage points ($V_1$, $V_2$) are shown in FIG. 6, alternatively, a smaller or greater number of vantage points may be used. Each of the vantage points ($V_1$, $V_2$) can transmit probe packets (e.g, data packets transmitted by a traceroute software tool) to the target Internet host 102 and to the landmark Internet host 104. Alternatively, another type of probe packet may be transmitted to the target Internet host 102 and to the landmark Internet host 104. For example, software applications running on the computers at the vantage points ($V_1$, $V_2$) may determine the route or path traversed by a probe packet through the network 106 from a source to a destination and measure time delays associated with transmitting the probe packet between nodes in the network 106. While FIG. 6 illustrates transmission of the probe packets to only a single landmark Internet host 104, alternatively, the probe packets may be sent to a plurality of the landmark Internet hosts 104, such as all or a plurality of the landmark Internet hosts 104 in the area of interest 300.

The illustrated portion of the network 106 includes three nodes ($R_1$, $R_2$, $R_3$) disposed or placed along four different packet-switched network pathways 600, 602, 604, 606 that extend from each of the vantage points ($V_1$, $V_2$) to each of the target Internet host 102 and the landmark Internet host 104. The probe packets are transmitted along the network pathways 600, 602, 604, 606 from the vantage points ($V_1$, $V_2$) to the target Internet host 102 and to the landmark Internet host 104. The probe packets are transmitted along multiple hops in each network pathway 600, 602, 604, 606. A "hop" refers to the transmission of a data packet from one node ($R_1$, $R_2$, $R_3$) to another node ($R_1$, $R_2$, $R_3$). For example, the network pathways 600, 602, 606 each include two hops and the network pathway 604 includes three hops. Each of the hops may alternatively be referred to as a leg of the network pathway 600, 602, 604, 606.

With respect to the example shown in FIG. 6, a first probe packet is transmitted from the first vantage point ($V_1$) to the landmark Internet host 104 along a first network pathway 600 that extends through a first node ($R_1$). The first network pathway 600 includes two legs ($D_1$, $D_5$). The first leg ($D_1$) extends from the first vantage point ($V_1$) to the first node ($R_1$). The fifth leg ($D_5$) extends from the first node ($R_1$) to the landmark Internet host 104. A second probe packet is transmitted from the first vantage point ($V_1$) to the target Internet host 102 along a second network pathway 602 that extends through the first node ($R_1$). The second network pathway 602 includes two legs ($D_2$, $D_5$). The second leg ($D_2$) extends from the first node ($R_1$) to the target Internet host 102.

A third probe packet is transmitted from the second vantage point ($V_2$) to the landmark Internet host 104 along a third network pathway 604 that extends through the second node ($R_2$) and the third node ($R_3$). The third network pathway 604 includes three legs ($D_3$, $D_6$, $D_7$). The sixth leg ($D_6$) extends from the second vantage point ($V_2$) to the second node ($R_2$). The third leg ($D_3$) extends from the second node ($R_2$) to the third node ($R_3$). The seventh leg ($D_7$) extends from the third node ($R_3$) to the landmark Internet host 104. A fourth probe packet is transmitted from the second vantage point ($V_2$) to the target Internet host 102 along a fourth network pathway 606 that extends through the second node ($R_2$). The fourth network pathway 606 includes two legs ($D_6$, $D_4$). The fourth leg ($D_4$) extends from the second node ($R_2$) to the target Internet host 102. While only three nodes ($R_1$, $R_2$, $R_3$), two vantage points ($V_1$, $V_2$), a single landmark Internet host 104, four network pathways 600, 602, 604, 606, and seven legs ($D_1$, $D_2$, $D_3$, $D_4$, $D_5$, $D_6$, $D_7$) of the network pathways 600, 602, 604, 606 are shown in the network 106, alternatively, a different number of one or more of the nodes ($R_1$, $R_2$, $R_3$), vantage points ($V_1$, $V_2$), landmark Internet hosts 104, network pathways 600, 602, 604, 606, and/or legs ($D_1$, $D_2$, $D_3$, $D_4$, $D_5$, $D_6$, $D_7$) may be used.

In one embodiment, one or more of the network latencies associated with transmitting the probe packets along the various legs ($D_1$, $D_2$, $D_3$, $D_4$, $D_5$, $D_6$, $D_7$) in the network 106 are examined to determine a derived distance between the landmark Internet host 104 and the target Internet host 102. For example, the network latencies may be examined to estimate a network latency of a network pathway extending from the landmark Internet host 104 to the target Internet host 102. With respect to the example shown in FIG. 6, such a network pathway would include the legs $D_1$ and $D_2$. The network pathway between the landmark Internet host 104 and the target Internet host 102 may not be a direct path. For example, the network pathway extending from the landmark Internet host 104 to the target Internet host 102 may not be the shortest linear path in Euclidean space, the shortest great-circle distance, or the shortest orthodromic distance between the geographic locations of the landmark Internet host 104 and the target Internet host 102. Alternatively, the network pathway may be the shortest linear path in Euclidean space, the shortest great-circle distance, or shortest orthodromic distance between the geographic locations of the landmark Internet host 104 and the target Internet host 102. In another embodiment, the network pathway extending from the landmark Internet host 104 to the target Internet host 102 may be the shortest path in Internet space, such as the path having the smallest delay, or a shorter path than one or more other paths between the landmark Internet host 104 and the target Internet host 102 in Internet space.

With respect to the example shown in FIG. 6, the network pathways 600, 602, 604, 606 may be identified by a traceroute software application or tool that provides details on the legs ($D_1$, $D_2$, $D_3$, $D_4$, $D_5$, $D_6$, $D_7$) along each network pathway 600, 602, 604, 606, as well as the network latencies of transmitting the probe packets along each leg ($D_1$, $D_2$, $D_3$, $D_4$, $D_5$, $D_6$, $D_7$). For example, the traceroute application or tool may provide a sequential list of the nodes ($R_1$, $R_2$, $R_3$) that the probe packets sequentially were transmitted through along each network pathway 600, 602, 604, 606 and network latencies of transmitting the probe packets among the nodes ($R_1$, $R_2$, $R_3$).

Based on the list of nodes ($R_1$, $R_2$, $R_3$) for the probe packets, one or more common nodes ($R_1$, $R_2$, $R_3$) can be identified. A "common node" is a node ($R_1$, $R_2$, $R_3$) in the network 106 that is disposed or placed in at least a first network pathway 600, 602, 604, 606 between a vantage point ($V_1$ or $V_2$) and the landmark Internet host 104 and in at least a second network pathway 600, 602, 604, 606 between the same vantage point ($V_1$ or $V_2$) and the target Internet host 102. For example, a common node may be a node ($R_1$, $R_2$, $R_3$) located at an intersection of at least two network pathways 600, 602, 604, 606 extending from the same vantage point ($V_1$ or $V_2$) to each of the landmark Internet host 104 and the target Internet host 102.

In one embodiment, the common node may be identified as the node ($R_1$, $R_2$, $R_3$) that is closer to the landmark Internet host 104 and/or the target Internet host 102 than one or more other nodes ($R_1$, $R_2$, $R_3$) and that is disposed or placed on at least two of the network pathways 600, 602, 604, 606 between a vantage point ($V_1$ or $V_2$) and the Internet hosts 102, 104. For example, the common node may be a node ($R_1$, $R_2$, $R_3$) that is a fewer number of hops or legs away from the landmark Internet host 104 and/or the target Internet host 102 than one or more other nodes ($R_1$, $R_2$, $R_3$). In the illustrated embodiment, the common node for the first vantage point ($V_1$) is the first node ($R_1$), as the first node ($R_1$) is disposed or placed along each of the first and second network pathways 600, 602 between the first vantage point ($V_1$) and each of the Internet hosts 102, 104 and the first node ($R_1$) is closer to the Internet hosts 102, 104 than other nodes on the network pathways 600, 602 (e.g., the vantage point ($V_1$). The common node for the second vantage point ($V_2$) is the second node ($R_2$), as the second node ($R_2$) is disposed or placed along each of the third and fourth network pathways 604, 606 between the second vantage point ($V_2$) and each of the Internet hosts 102, 104 and the first node ($R_1$) and is closer to the Internet hosts 102, 104 than other nodes (e.g., the third node ($R_3$)) on the network pathways 604, 606. In one embodiment, the common node may be the closest node ($R_1$, $R_2$, $R_3$) to both the Internet hosts 102, 104. Alternatively, the common node may not be the closest node ($R_1$, $R_2$, $R_3$) but may be a node ($R_1$, $R_2$, $R_3$) that is closer to the Internet hosts 102 and/or 104 relative to one or more other nodes ($R_1$, $R_2$, $R_3$) on the network pathways 600, 602, 604, 606 extending from a common vantage point ($V_1$ or $V_2$) to the Internet hosts 102.

The network latencies between each common node ($R_1$, $R_2$) and each of the Internet hosts 102, 104 are identified. With respect to the landmark Internet host 104, the network latency for transmitting the probe packets from the first common node ($R_1$) to the landmark Internet host 104 is the network latency of the first leg ($D_1$) and the network latency for transmitting the probe packets from the second common node ($R_2$) to the landmark Internet host 104 is the network latencies of the third and seventh legs ($D_3$, $D_7$). With respect to the target Internet host 102, the network latency for transmitting the probe packets from the first common node ($R_1$) to the target Internet host 102 is the network latency of the second leg ($D_2$) and the network latency for transmitting the probe packets from the second common node ($R_2$) to the target Internet host 102 is the network latency of the fourth leg ($D_4$).

The sum of the network latencies for the legs that extend from the landmark Internet host 104 to the target Internet host 102 via the first common node ($R_1$) can represent a derived network latency for a derived network pathway extending from the landmark Internet host 104 to the target Internet host 102. For example, the sum of the network latencies along the first and second legs ($D_1$, $D_2$) can represent a derived network latency for a network pathway that includes the first and second legs ($D_1$, $D_2$) and extends through the first common node ($R_1$) between the Internet hosts 102, 104. The sum of the network latencies along the third, fourth, and seventh legs ($D_3$, $D_4$, $D_7$) can represent a derived network latency for a derived network pathway that includes the third, fourth, and seventh legs ($D_3$, $D_4$, $D_7$) and extends through the second common node ($R_2$) from the landmark Internet host 104 to the target Internet host 102.

Because one or more of the vantage points ($V_1$, $V_2$) may transmit probe packets to the Internet hosts 102, 104 along different network pathways 600, 602, 604, 606, the vantage points ($V_1$, $V_2$) may be associated with different common nodes. For example, the common node associated with the first vantage point ($V_1$) is the first node ($R_1$) and the common node associated with the second vantage point ($V_2$) is the second node ($R_2$). As a result, different vantage points ($V_1$, $V_2$) may determine different derived network latencies along different derived network pathways extending from the same landmark Internet host 104 to the same target Internet host 102. For example, the derived network pathway associated with the first vantage point ($V_1$) may extend along the first and second legs ($D_1$, $D_2$) while the derived network pathway associated with the second vantage point ($V_2$) extends along the third, fourth, and seventh legs ($D_3$, $D_4$, $D_7$).

In one embodiment, at least one of the derived network latencies associated with the different vantage points ($V_1$, $V_2$) is selected. The selected derived network latency may be a network latency that is shorter than one or more other derived network latencies. For example, if nine vantage points are used to calculate nine different derived network latencies for different derived network pathways extending from the landmark Internet host 104 to the target Internet host 102, then the derived network latency that is shorter than one or more other derived network latencies may be selected. Alternatively, the selected derived network latency may be the shortest derived network latency associated with the vantage points.

Several derived network latencies can be calculated for the derived network pathways that extend from different landmark Internet hosts 104 to the same target Internet host 102. These derived network latencies can be used to calculate derived distances between each of the different landmark Internet hosts 104 and the target Internet host 102.

In one embodiment, one or more of the network pathways between the vantage points ($V_1$, $V_2$) and the landmark Internet hosts 104 can be "cached." For example, the network pathways, including the nodes and/or legs along the network pathways, and/or associated network latencies can be recorded and saved in a database, table, list, or other memory structure. The network pathway extending from a vantage point ($V_1$ or $V_2$) to a landmark Internet host 104, and the associated network latencies, can be obtained using a software tool (e.g., a traceroute application or tool) and then saved as a cached network pathway. This cached network pathway may then be obtained from the database, table, list, or other memory structure when needed; e.g., when the cached network pathway can be used to determine a common node, as described above. The cached network pathway can be periodically updated. For example, changes in nodes, landmark Internet hosts 104, and the like, may change the network pathway and/or corresponding network latencies such that the cached network pathway is no longer accurate. One or more of the cached network pathways can be periodically updated, such as every hour, every day (e.g., early in the morning), every month, every three months, every year, and the like.

Returning to the discussion of the method 200 shown in FIGS. 2A and 2B, at 210, the derived network latencies are used to calculate relative distances between the landmark Internet hosts 104 and the target Internet host 102. For example, the derived network latencies may be determined for each landmark Internet host 104 in the area of interest 300 and the candidate network latencies can be used to calculate geographic distances between each landmark Internet host 104 and the target Internet host 102. The geographic distances may be great circle distances. Alternatively, the geographic distances may be linear distances in Euclidean space, orthodromic distances, or other distances. As described above, the derived network latencies can be used to calculate relative distances based on a relationship between time and distance, such as the relationship expressed above in Equation #1 or another relationship. For example, a relative distance between a landmark Internet host 104 and the target Internet host 102 may be the product of the derived network latency of the derived network pathway extending from the landmark Internet host 104 to the target Internet host 102 and a speed or velocity of data transmission (e.g., a fraction of the speed of light), as described above. A set of the relative distances may be calculated based on the derived network latencies of the landmark Internet hosts 104 in the area of interest 300.

One or more of the derived network latencies may increase due to inflation by one or more nodes ($R_1$, $R_2$, $R_3$) in the network 106. "Inflation" refers to the delay or postponement of re-transmitting a received data packet at a node in the network 106. For example, some nodes ($R_1$, $R_2$, $R_3$) may postpone transmission of a received data packet. For example, a router can be programmed to introduce a delay between receiving a data packet, such as a probe packet, and transmitting the data packet to another node or destination in the network 106. The delay may be a delay in addition to the time required for normal processing and handling of the data packets. Such introduced delays can be referred to as "inflating." In one embodiment, one or more network latencies of network pathways extending from a first landmark Internet host 104 to a different, second landmark Internet host 104 are calculated and compared to a predetermined or known geographic distance between the first and second landmark Internet hosts 104 to determine if one or more nodes ($R_1$, $R_2$, $R_3$) are inflating the candidate network latencies associated with the nodes ($R_1$, $R_2$, $R_3$).

Figure 7:
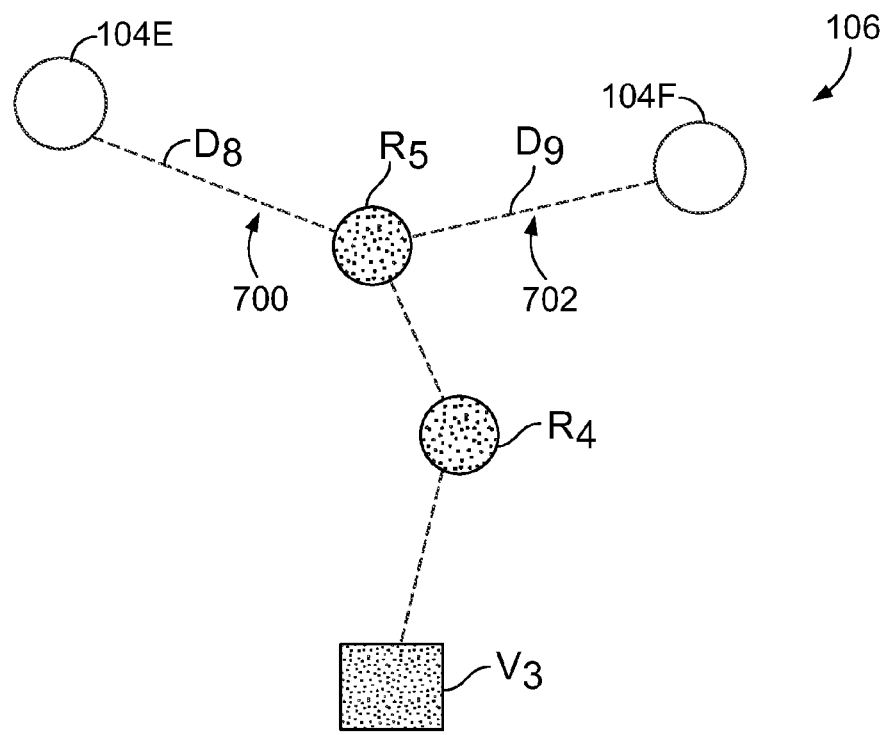
FIG. 7 illustrates a diagram of another portion of the network shown in FIG. 1 in accordance with one embodiment.

FIG. 7 illustrates a diagram of another portion of the network 106 in accordance with one embodiment. The illustrated portion of the network 106 includes a vantage point ($V_3$), such as a computer running a traceroute software application or tool, a plurality of nodes ($R_4$, $R_5$), and a plurality of landmark Internet hosts 104E, 104F. One or more of the nodes ($R_4$, $R_5$) may be a common node of one or more network pathways extending between a landmark Internet host 104 and a target Internet host 102 (shown in FIG. 1), as described above. In order to determine if one or more of the nodes ($R_4$, $R_5$) is inflating network latencies of data packets transmitted through the nodes ($R_4$, $R_5$), the vantage point ($V_3$) can transmit probe packets to each of the landmark Internet hosts 104E, 104F through the nodes ($R_4$, $R_5$). The probe packets can be transmitted along a fifth network pathway 700 that extends from the vantage point ($V_3$) to the landmark Internet host 104E via the nodes ($R_4$, $R_5$) and along a sixth network pathway 702 that extends from the vantage point ($V_3$) to the other landmark Internet host 104F via one or more of the nodes ($R_4$, $R_5$).

A common node of the landmark Internet hosts 104E, 104F can be identified as described above, similar to the manner of identifying a common node of a landmark Internet host 104 and a target Internet host 102 (shown in FIG. 1). For example, a common node may be identified as the node ($R_4$, $R_5$) that is closer to the landmark Internet host 104E and/or the landmark Internet host 104F than one or more other nodes ($R_4$, $R_5$) and that is disposed or placed on at least two of the network pathways 700 702 between the vantage point ($V_3$) and the landmark Internet hosts 104E, 104F. In the illustrated embodiment, the common node may be identified as the fifth node ($R_5$).

The network latencies between the common node ($R_5$) and each of the landmark Internet hosts 104E, 104F can be identified. With respect to the landmark Internet host 104E, the network latency for transmitting the probe packets from the common node ($R_5$) to the landmark Internet host 104E is the network latency of an eight leg ($D_8$). With respect to the landmark Internet host 104F, the network latency for transmitting the probe packets from the common node ($R_5$) to the landmark Internet host 104F is the network latency of a ninth leg ($D_9$). The sum of the network latencies for the legs ($D_8$ and $D_9$) that extend from the landmark Internet host 104E to the other landmark Internet host 104F via the common node ($R_5$) can represent a derived network latency for a derived network pathway that extends from the landmark Internet host 104E to the landmark Internet host 104F.

This derived network latency can be converted into a relative distance between the landmark Internet hosts 104E, 104F. As described above, a relative distance can be an estimated geographic distance between Internet hosts that is based on derived network latencies. The estimated geographic distance may be a great circle distance. Alternatively, the estimated geographic distance may be a linear distance in Euclidean space, an orthodromic distance, or another distance. The derived network latency between the landmark Internet hosts 104E, 104F may be calculated using a relationship between time and distance, such as the relationship expressed above in Equation #1or another relationship, as described above.

The relative distance between the landmark Internet hosts 104E, 104F can be compared to a known or predetermined distance between the geographic locations of the landmark Internet hosts 104E, 104F to determine if one or more of the nodes ($R_4$, $R_5$) are inflating the network latencies. For example, the known locations of the landmark Internet hosts 104E, 104F (e.g. longitude and latitude, postal addresses, and the like) can be used to calculate an actual geographic distance between the landmark Internet hosts 104E, 104F. The actual geographic distance can be compared to the relative distance. If the relative distance differs from the actual geographic distance by at least a predetermined amount, then the relative distance may indicate that one or more of the nodes ($R_4$, $R_5$) may be inflating the network latencies upon which the relative distance is based. For example, if the relative distance is smaller than the actual geographic distance by at least a threshold amount, then the relative distance may indicate that one or more of the nodes ($R_4$, $R_5$) may be inflating the network latencies. Alternatively, if the relative distance is smaller than the actual geographic distance, then the relative distance may indicate that one or more of the nodes ($R_4$, $R_5$) may be inflating the network latencies. On the other hand, if the relative distance does not differ from the actual geographic distance by at least a predetermined amount, then the relative distance may not indicate that one or more of the nodes ($R_4$, $R_5$) may be inflating the network latencies upon which the relative distance is based. For example, if the relative distance is larger than the actual geographic distance, then the relative distance may not indicate that one or more of the nodes ($R_4$, $R_5$) may be inflating the network latencies upon which the relative distance is based.

Returning to the discussion of the method 200 shown in FIGS. 2A and 2B, the network pathways that are associated with nodes ($R_4$, $R_5$) identified as inflating network latencies may be disregarded from the calculation of relative distances between landmark Internet hosts 104 and the target Internet host 102. For example, if a network latency upon which the relative distance between a landmark Internet host 104 and the target Internet host 102 is based at least in part on inflating by one or more nodes, then that relative distance and/or the landmark Internet host 104 may not be used to determine a derived geographic location of the target Internet host 102 in one embodiment.

At 212, one or more landmark Internet hosts 104 are identified based on the relative distances between the landmark Internet hosts 104 and the target Internet host 102. For example, from the set of relative distances between the landmark Internet hosts 104 in the area of interest 300 (shown in FIG. 3) and the target Internet host 102, one or more of the relative distances are selected and the landmark Internet hosts 104 associated with the selected relative distances are identified as candidate landmark Internet hosts 104. The selected relative distances may be one or more distances that are shorter than one or more other relative distances in the set. Alternatively, a single selected relative distance that is shorter than the other relative distances in the set is selected. In one embodiment, the selected relative distances may be a predetermined percentage, fraction, or number of the shortest relative distances in the set. Alternatively, one or more other relative distances may be selected from the set.

At 214, a size of the area of interest 300 (shown in FIG. 3) is reduced based on the candidate landmark Internet hosts 104. The area of interest 300 can be decreased in size to a reduced area of interest that includes a subset of the candidate landmark Internet hosts 104 and the target Internet host 102. For example, the geographic surface area encompassed by the original area of interest 300 can be reduced to a surface area that includes the geographic locations of a subset of the candidate landmark Internet hosts 104 and the target Internet host 102. In one embodiment, the candidate Internet hosts 104 that are selected are the candidate landmark Internet hosts 104 having relative distances from the target Internet host 102 that are smaller than relative distances of one or more other landmark Internet hosts 104. For example, a predetermined number, fraction, or percentage of the candidate Internet hosts 104 having the smallest relative distances to the target Internet host 102 may be selected for inclusion in the subset. Alternatively, one or more candidate landmark Internet hosts 104 having larger relative distances may be selected for inclusion in the subset of landmark Internet hosts 104.

Figure 8:
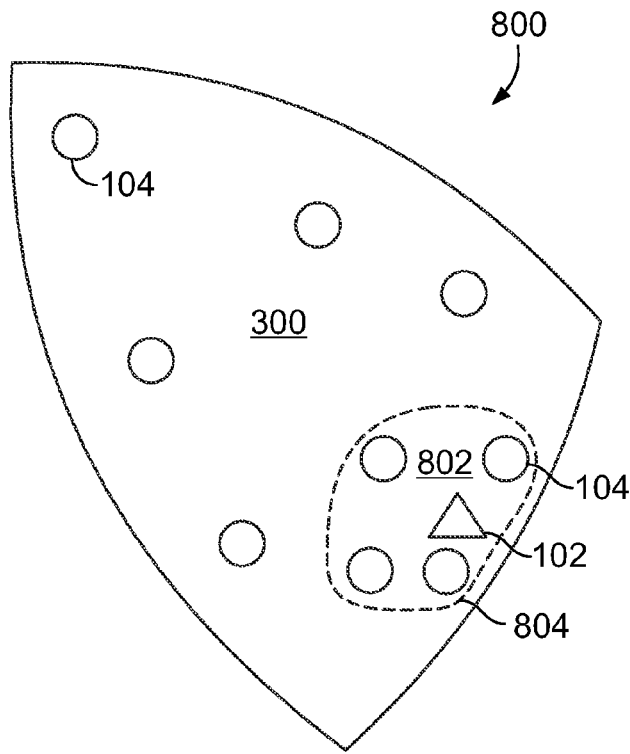
FIG. 8 is another map illustrating the area of interest and a reduced area of interest in accordance with one embodiment.

FIG. 8 is a map 800 illustrating the area of interest 300 and a reduced area of interest 802 in accordance with one embodiment. As described above, several candidate landmark Internet hosts 104 and the target Internet host 102 are disposed within the area of interest 300. Some of the candidate landmark Internet hosts 104 are disposed farther from the target Internet host 102 than other candidate landmark Internet hosts 104. In the illustrated embodiment, the relative distances for the candidate landmark Internet hosts 104 are used to determine the size of the reduced area of interest 802. For example, the landmark Internet hosts 104 having smaller relative distances may be selected and the geographic locations of the candidate landmark Internet hosts 104 may be used to determine a boundary 804 of the reduced area of interest 802. As described above, the geographic locations of the landmark Internet hosts 104 may be known or predetermined. The boundary 804 can be established around the landmark Internet hosts 104 that are selected for inclusion in the reduced area of interest 802 such that the reduced area of interest 802 is disposed within the area of interest 300 and encompasses one or more of the landmark Internet hosts 104 located closer to the target Internet host 102 (e.g., those landmark Internet hosts 104 having smaller derived network latencies).

Returning to the discussion of the method 200 shown in FIGS. 2A and 2B, at 216, network latencies of probe packets transmitted to the target Internet host 102 (shown in FIG. 1) and one or more of the landmark Internet hosts 104 (shown in FIG. 1) in the reduced area of interest 802 (shown in FIG. 8) are measured. For example, similar to 208 of the method 200 described above, probe packets sent by a traceroute software tool or program may be transmitted from one or more vantage points ($V_1$, $V_2$) (shown in FIG. 6) to the landmark Internet hosts 104 of the reduced area of interest 802 and to the target Internet host 102. Network pathways of the probe packets are determined and network latencies are measured for the probe packets, as described above. Based on the network pathways, one or more common nodes ($R_1$, $R_2$) (shown in FIG. 6) of the landmark Internet hosts 104 and the target Internet hosts 102 are identified. The common nodes ($R_1$, $R_2$) are used to determine derived network pathways that extend from the landmark Internet hosts 104 to the target Internet hosts 102 through the common nodes ($R_1$, $R_2$). The derived network latencies for the derived network pathways that extend from the landmark Internet hosts 104 to the target Internet hosts 102 through the common nodes ($R_1$, $R_2$) are determined, as described above. For example, the network latencies associated with the various legs of the derived network pathway that extends from the landmark Internet host 104 to the target Internet host 102 may be summed as the derived network latency for the derived network pathway.

At 218, the derived network latencies associated with the landmark Internet hosts 104 are used to calculate relative distances between the landmark Internet hosts 104 and the target Internet host 102 in the reduced area of interest 802 (shown in FIG. 8). In one embodiment, if one or more of the derived network latencies is at least partially artificial due to inflation by one or more nodes ($R_1$, $R_2$, $R_3$) in the network 106 (shown in FIG. 1), then the derived network pathways that include or extend through the nodes ($R_4$, $R_5$) that are identified as inflating the network latencies may be disregarded from the calculation of relative distances between the landmark Internet hosts 104 and the target Internet host 102. As described above, the relative distance between a landmark Internet host 104 and the target Internet host 102 may be calculated as a product of the derived network latency associated with the landmark Internet host 104 and a velocity or speed of data transmission, such as a fraction of the speed of light, as described above.

At 220, one or more of the landmark Internet hosts 104 (shown in FIG. 1) are selected based on the relative distances between the landmark Internet hosts 104 and the target Internet host 102 (shown in FIG. 1). For example, one or more of the relative distances between the landmark Internet hosts 104 in the reduced area of interest 802 (shown in FIG. 8) and the target Internet host 102 are selected, similar to as described above. The selected relative distances may be one or more relative distances that are shorter than one or more other relative distances in the set. For example, the relative distances that are selected may be the relative distances associated with the landmark Internet hosts 104 that are geographically closer to the target Internet host 102 than one or more other landmark Internet hosts 104 in the reduced area of interest 802 based on the relative distances. In one embodiment, the selected landmark Internet hosts 104 having the shortest relative distances to the target Internet host 102 are selected. Alternatively, one or more other landmark Internet hosts 104 may be selected.

At 222, a derived geographic location of the target Internet host 102 (shown in FIG. 1) is determined based on the geographic locations of one or more of the selected landmark Internet hosts 104 (shown in FIG. 1). For example, one or more of the landmark Internet hosts 104 having a relatively small or the smallest relative distance to the target Internet host 102 may be used to determine the derived geographic location of the target Internet host 102. The geographic locations of the additional candidate landmark Internet hosts 104 may be known, and the derived geographic location of the target Internet host 102 may be based on these known locations. For example, the derived geographic location of the target Internet host 102 may be equated with or set to be the actual or verified geographic location of the landmark Internet host 104 having the smallest relative distance from the target Internet host 102. Alternatively, the derived geographic location of the target Internet host 102 may be equated with or set to be the geographic location of the landmark Internet host 104 having a relative distance from the target Internet host 102 that is smaller than one or more of the other landmark Internet hosts 104. The derived geographic location of the target Internet host 102 that is determined based on these relative distances may be slightly different than the actual geographic location of the target Internet host 102, but may be relatively close to the actual geographic location of the target Internet host 102. For example, the derived geographic location of the target Internet host 102 that is based on the relative distances may be no greater than 1 km (or 0.62 miles), no greater than 0.5 km (or 0.31 miles), no greater than 0.2 km (or 0.12 miles), or no greater than 0.1 km (or 0.06 miles) from the actual geographic location of the target Internet host 102.

In another embodiment, instead of determining the derived geographic location of the target Internet host 102 (shown in FIG. 1), the reduced area of interest 802 (shown in FIG. 8) may be further reduced in size by selecting several of the additional landmark Internet hosts 104 (shown in FIG. 1) that are relatively close to the target Internet host 102 and reducing the reduced area of interest 802 to a smaller area of interest. One or more landmark Internet hosts 104 can be identified in the smaller area of interest and the relative distances calculated between these landmark Internet hosts 104 and the target Internet host 102, as described above. The area of interest can be repeatedly decreased in size one or more times, as described above, before determining a derived geographic location of the target Internet host 102.

The landmark Internet hosts 104 (shown in FIG. 1) that are used to determine the derived geographic location of the target Internet host 102 (shown in FIG. 1) may be obtained in a variety of manners. In one embodiment, a database, list, table, or other memory structure stores a group of landmark Internet hosts 104 and associated geographic locations (e.g., postal addresses) of the landmark Internet hosts 104. Such a database, list, table, or memory structure may be stored in the memory 1204 (shown in FIG. 12). The database, list, table or other memory structure may be queried for the landmark Internet hosts 104 (e.g., the domain names, IP addresses, or other identifying information) and/or the associated geographic locations when needed, as described above. Alternatively, the geographic locations of the landmark Internet hosts 104 may be obtained on demand, such as by searching for the geographic locations of potential landmark Internet hosts 104 using a search engine on the network 106 (shown in FIG. 1) when the geographic locations or the landmark Internet hosts 106 are needed in accordance with one or more operations described above in the method 200.

As described above, one embodiment described herein includes identifying an area of interest that includes the target Internet host, reducing the area of interest to a reduced area of interest based on relative distances between the landmark Internet hosts and the target Internet hosts, and determining additional relative distances between landmark Internet hosts in the reduced area of interest and the target Internet host to determine a derived geographic location of the target Internet host. Alternatively, the initial area of interest may be determined by another technique, such as from a database that associates different geographic areas with different IP addresses, or by another computational technique. In one embodiment, the area of interest is not reduced to a reduced area of interest. For example, the initial area of interest may be identified and the derived geographic distance of the target Internet host may be determined based on the relative distances between the landmark Internet hosts and the target Internet host without reducing the area of interest. In another embodiment, no area of interest is identified. For example, the derived geographic location of the target Internet host may be determined based on relative distances between at least one randomly selected, arbitrarily selected, or predetermined landmark Internet host among a plurality of available landmark Internet hosts and the target Internet host.

Figure 9:
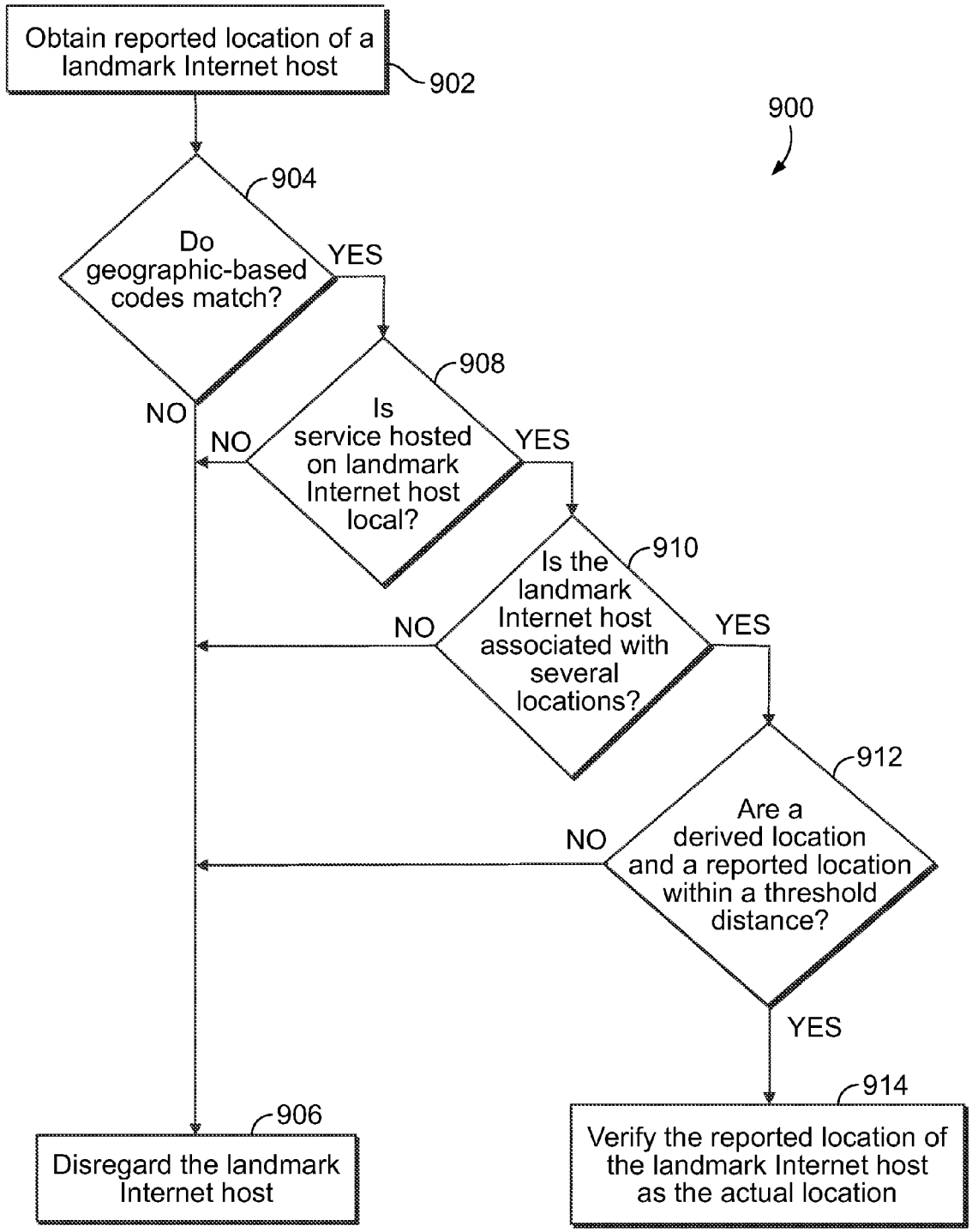
FIG. 9 is a flowchart of a method for extracting and verifying locations of landmark Internet hosts shown in FIG. 1 in accordance with one embodiment.

FIG. 9 is a flowchart of a method 900 for extracting the landmark Internet hosts 104 (shown in FIG. 1) and verifying reported locations of the landmark Internet hosts 104 in accordance with one embodiment. The method 900 may be used to create, modify, and/or add to a database, list, table, or other memory structure of the landmark Internet hosts 104 and associated geographic locations for use in determining a derived geographic location of the target Internet host 102. In one embodiment, the method 900 can be used to obtain and/or verify the landmark Internet hosts 104 and associated geographic locations on demand. For example, the method 900 can be used to obtain a new landmark Internet host 104 that is not included in a preexisting database when one or more additional landmark Internet hosts 104 are needed to reduce the area of interest 300 (shown in FIG. 3) and/or determine a derived geographic location of the target Internet host 102. The method 900 can be used to verify a geographic location that is reported or claimed by the landmark Internet host 104 as the actual geographic location of the landmark Internet host 104

At 902, a reported location of a landmark Internet host 104 (shown in FIG. 1) is obtained. The reported location includes a geographic location that is associated with or claimed by the landmark Internet host 104. For example, a website associated with an entity and hosted on the landmark Internet host 104 of the entity may list, or "claim," a geographic location of the entity, such as the postal address of a business of the entity.

In one embodiment, the reported location of the landmark Internet host 104 (shown in FIG. 1) can be obtained by automatically or manually mining publicly available information, such as Internet mapping services or Internet search engines. For example, a mapping service or Internet search engine, such as Bing™ maps, Google™ maps, and the like, can be queried with a geographic-based code and one or more keywords. Alternatively, other, non-mapping Internet search engines may be used. As described above, the geographic-based code can include one or more alphanumeric codes representative of a geographic location, such as ZIP codes, telephone area codes, county names, city names, burrough names, neighborhood names, state names, and the like. The keywords can be related to a category of entities, such as the keywords "business," "government," "university," "school," "restaurant," and the like. The results of the search from the mapping service or search engine can provide one or more websites and/or addresses (e.g., postal addresses) of the landmark Internet hosts 104, or entities (e.g., businesses, government offices, schools, and the like) having websites that are hosted by the landmark Internet hosts 104.

Figure 10:
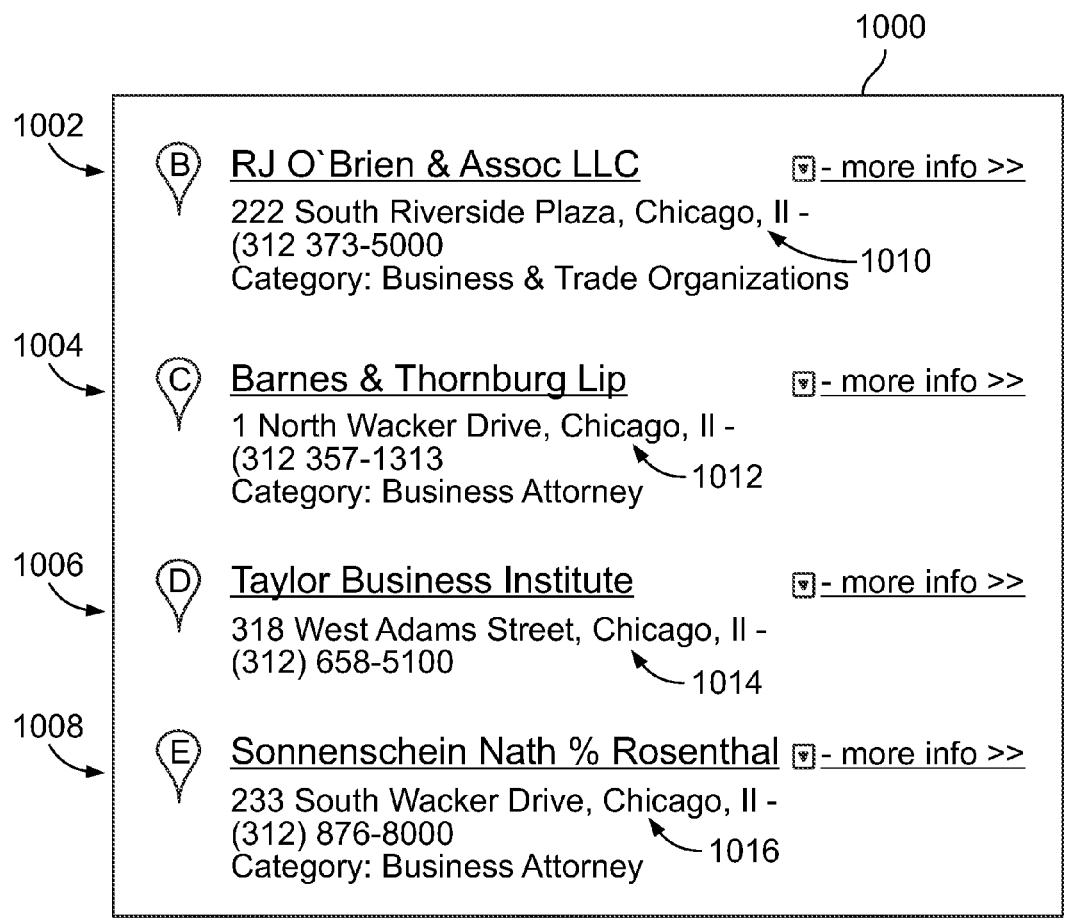
FIG. 10 is an example of a screenshot that may be used to obtain the landmark Internet hosts shown in FIG. 1 in accordance with one embodiment.
Figure 11:
FIG. 11 is another example of a screenshot that may be used to obtain the landmark Internet hosts shown in FIG. 1.

FIGS. 10 and 11 are examples of screenshots 1000, 1100 that may be used to obtain the landmark Internet hosts 104 (shown in FIG. 1) in accordance with one embodiment. The screenshot 1000 of FIG. 10 may be generated on a computer monitor of a computer when a user searches for "businesses" and the ZIP code "60606" on the search engine Google™ maps (maps.google.com). As shown in the screenshot 1000, several entities 1002, 1004, 1006, 1008 are listed that categorized as businesses located in, or associated with, the ZIP code 60606. A postal address 1010, 1012, 1014, 1016 is listed with each entity 1002, 1004, 1006, 1008. Each entity 1002, 1004, 1006, 1008 may be used as a reported location of the corresponding landmark Internet host 104 (shown in FIG. 1).

The screenshot 1100 of FIG. 11 may be generated on a computer monitor of a computer based on the search results shown in the screenshot 1000. For example, the screenshot 1100 represents a website 1102 of the entity 1002 (shown in FIG. 10) listed in the search results of the screenshot 1000. The website 1102 may be obtained from the search results in the screenshot 1000 so that a domain name 1104 of the website 1102 (e.g., "http://www.rjobrien.com/corp/index.php") can be obtained in addition to the postal address 1010 of the entity 1002. For example, the Internet browser used to view the website 1102 may display the domain name 1104. The domain name 1104 of the website 1102 and the postal address 1010 of the entity 1002 can be stored in the database, list, table, or other memory structure as being associated with the landmark Internet host 104 (shown in FIG. 1). The postal address 1010 can be saved as the reported location of the landmark Internet host 104. In one embodiment, the domain name 1104 of the website 1102 of the entity 1002 is converted into an IP address (e.g., "198.63.227.47") that is stored and associated with the postal address 1010 of the entity 1002. The postal address 1010 of the entity 1002 also may be obtained from the website 1102, as is shown in FIG. 11.

In one embodiment, reported locations of several potential landmark Internet hosts 104 (shown in FIG. 1) can be obtained using publicly available Internet search engines. In addition or as an alternate embodiment, one or more potential landmark Internet hosts 104 can be obtained from non-publicly available sources. For example, a third party may cooperatively provide the reported locations (e.g., postal addresses and ZIP codes) of one or more landmark Internet hosts 104. By way of example only, an Internet Service Provider (ISP) may provide a list of entities that obtain Internet access from the ISP, along with the domain names and/or IP addresses of the potential landmark Internet hosts 104 that host websites associated with the entities and the reported locations of the entities. Individual entities (e.g., businesses, government offices, schools, universities, persons, and the like) similarly may voluntarily and/or on a commercial basis provide the domain names and/or static IP addresses of the computers that host their websites, email exchange servers, and/or used as personal computers and the geographic locations of the computers as the landmark Internet hosts 104. For example, online, mobile, and/or other traditional advertising (e.g., television, radio, billboard, newspaper, magazine, leaflet, and other types of advertisements) may be used to entice entities to voluntarily provide the domain names and/or IP addresses of potential landmark Internet hosts 104. The entities may manually enter the information into a website.

In one embodiment, one or more email exchange servers may be used as landmark Internet hosts 104 (shown in FIG. 1). For example, one or more entities may have websites associated with the entities hosted in a location that is remote (e.g., not in the same location) as the geographic location of the entity. However, one or more of the entities may keep the email exchange servers used by the entities to provide email service for employees, customers, and the like of the entities at the same location as the geographic location of the entity. In order to find email exchange servers that can be landmark Internet hosts 104, a website associated with an entity located in an area of interest (e.g., one or more ZIP codes or other geographic-based codes) may be found as described above. For example, the domain name "www.rjobrien.com" may be obtained from the Internet browser used to generate the screenshot 1100 (shown in FIG. 11). The Domain Name System (DNS) may be queried with the domain name and/or the IP address of the domain name. For example, the DNS may be queried using the Linux command "dig" and/or using one or more DNS search engines such as ZoneEdit® (www.zoneedit.com) to obtain the domain names of one or more email exchange servers associated with the website domain name of the entity. Alternatively, other tools or applications may be used to obtain the email address domain names of the email exchange servers associated with the website domain name of the entity. The email address domain names of the email exchange servers can be converted into IP addresses. The IP addresses and domain names of the email exchange servers can be stored in the database, table, list, or other memory structure along with the reported location associated with the entity, similar to as described above.

Returning to the discussion of the method 900 shown in FIG. 9, once a reported location of a landmark Internet host 104 (shown in FIG. 1) is obtained, the reported location may be examined in order to verify the reported location, or confirm that the reported location is the actual geographic location or is close to the actual geographic location at which the potential landmark Internet host 104 is located. For example, the reported location obtained from an Internet search engine may differ from the geographic location as the entity associated with the landmark Internet host 104 if the website of the entity is remotely hosted by a third party (e.g., the business of the entity is located at one postal address but the server that hosts the website of the entity may be located at another postal address). The method 900 includes several examinations of the reported location of the landmark Internet host 104. One or more of these examinations may be used to confirm that the reported location is the actual location or is relatively close to the actual location (e.g., within the same building, the same city block, and the like) of the landmark Internet host 104. In one embodiment, less than all of the examinations described below are used to verify the reported location as the actual location.

At 904, the geographic-based code of the reported location of the landmark Internet host 104 (shown in FIG. 1) is compared with the geographic-based code used to search for the landmark Internet host 104. As described above, Internet search engines may be used to search for landmark Internet hosts 104 using one or more geographic-based codes, such as ZIP codes or other similar codes. However, a search engine may return several landmark Internet hosts 104 with reported locations that include geographic-based codes that do not match the queried geographic-based code. For example, the search engine may return search results that include several landmark Internet hosts 104 that have reported locations near the geographic-based codes used to search the search engine, but not located in the geographic-based codes used to search the search engine.

In one embodiment, if the geographic-based code of the reported location of the landmark Internet host 104 (shown in FIG. 1) does not match or correspond to the geographic-based code used to search for the landmark Internet host 104, then the geographic-based code of the reported location may indicate that the landmark Internet host 104 does not have a geographic location in the queried geographic-based code. For example, if the search engine is queried with a ZIP code of "10036" and "business," and the search engine provides search results that include a business entity having a reported location with a ZIP code of 10010, then the entity may be located outside of the queried geographic code. As a result, flow of the method 900 continues to 906.

At 906, the landmark Internet host 104 (shown in FIG. 1) is disregarded and is not used as a landmark Internet host 104 as described above. For example, the landmark Internet host 104 may not be used in connection with one or more embodiments of the method 200 (shown in FIG. 2) to reduce the area of interest 300 (shown in FIG. 3) and/or to determine a derived geographic location of the target Internet host 102 (shown in FIG. 1), as described above.

On the other hand, if the geographic-based code of the reported location of the landmark Internet host 104 (shown in FIG. 1) does match the geographic-based code used to search for the landmark Internet host 104, then the geographic-based code of the reported location may indicate that the landmark Internet host 104 does have a geographic location in the queried geographic-based code. For example, if the search engine is queried with a ZIP code of "10036" and "business" and the search engine provides search results that include a business entity having a reported location with the same ZIP code of 10036, then the entity may be located within of the queried geographic code. As a result, flow of the method 900 continues to 908.

At 908, the service hosted by the landmark Internet host 104 (shown in FIG. 1) is examined to determine if the service is locally or remotely hosted. For example, an entity may not always host a website locally, or on a computer that is disposed at the same geographic location as the entity. Instead, the entity may use a content delivery network or a content distribution network (CDN) to distribute content from the website to others, use shared hosting techniques to store or host the website or data, or may otherwise have the landmark Internet host 104 that hosts the website of the entity located at a geographic location that is different from the entity. As a result, there may not be a one-to-one correspondence between the reported location of the entity and the IP address of the landmark Internet host 104. For example, a CDN server may host websites for multiple different entities having different geographic locations. Likewise, in the shared hosting example, a single IP address of a landmark Internet host 104 may be used by many different websites or domain names of different entities having diverse geographic locations.

In order to avoid using a landmark Internet host 104 (shown in FIG. 1) that hosts services (e.g., websites) for plural different entities having different geographic locations, the service that is hosted by the landmark Internet host 104 can be accessed by a plurality of different techniques. For example, a website of an entity that is hosted on the landmark Internet host 104 can be viewed using the domain name of the website (e.g., "www.manhattanmailboxes.com") and by using the IP address associated with the website (e.g., 216.39.62.190). Alternatively, another technique may be used. If the content or material on the website returned by the plurality of techniques (e.g., by using the domain name and the IP address) are the same, then the IP address may indicate that the landmark Internet host 104 belongs to a single entity or only hosts the services of that entity and may be located at the reported location of the entity. As a result, flow of the method 900 continues to 910. The content or material of the service as viewed based on the domain name and the IP address may include the head of the website (e.g., the code of the website as labeled by the HTML tags <head> and </head>), the title of the website (e.g., the code of the website as labeled by the HTML tags <title> and </title>), or other text, alphanumeric, or other information on the website.

On the other hand, if the content or material on the website returned by the plurality of techniques are not the same, then the IP address may indicate that the landmark Internet host 104 does not belong to a single entity and/or hosts the services of several different entities located at different geographic locations. As a result, flow of the method 900 returns to 906, where the landmark Internet host 104 is disregarded. For example, with respect to the website having the domain name "www.manhattanmailboxes.com" and an IP address of 216.39.62.190, accessing the website using the domain name provides a user with the website of the entity Manhattan Mailboxes. But, attempting to access the website using the IP address results in the user receiving a website showing "access error," which indicates that the IP address may correspond to a server that hosts websites of many different entities.

At 910, the landmark Internet host 104 (shown in FIG. 1) is examined to determine if the entity having one or more services hosted by the landmark Internet host 104 has several different geographic locations. For example, a company may be headquartered in a first geographic location but have several branches or other offices located in other, different geographic locations. In another example, a medium size organization can also have several branch offices deployed locally in the vicinity (e.g., same city) as the organization. The different branch offices of the entity may be disposed in different geographic-based codes (e.g., ZIP codes), while several or all of the branch offices have a website with the same domain name and/or IP address. For example, the website of all branches may be have a common domain name and a common IP address of a server that is located at one of the branches or at the headquarters.

In one embodiment, the domain name of a website hosted by the examined landmark Internet host 104 (e.g., the landmark Internet host 104 whose reported location is being examined) and/or IP address of the website is compared to the domain names and/or IP addresses of one or more other landmark Internet hosts 104. For example, the domain name and/or IP address of the website hosted by the examined landmark Internet host 104 may be compared to the domain names and/or IP addresses of one or more previously verified landmark Internet hosts 104 (e.g., landmark Internet hosts 104 having reported locations that were verified as being the actual locations of the landmark Internet hosts 104) and/or one or more unverified landmark Internet hosts 104 (e.g., landmark Internet hosts 104 having reported locations that have not yet been verified).

If the examined landmark Internet host 104 (shown in FIG. 1) has a domain name and/or an IP address that matches (e.g., has one or more common words or alphanumeric phrases in common) the domain name and/or IP address of one or more other landmark Internet hosts 104, then the geographic-based codes of the examined landmark Internet host 104 and of the other landmark Internet hosts 104 are compared. If the geographic-based codes match (e.g., are the same or represent the same location), then the common domain names and/or IP addresses and the different geographic-based codes may indicate that the examined landmark Internet host 104 and the other landmark Internet hosts 104 are associated with the same entity (e.g., same company) but are geographically diverse (e.g., are branch offices in different ZIP codes). As a result, flow of the method 900 returns to 906, where the examined landmark Internet host 104 is disregarded. In one embodiment, one or more of the other landmark Internet hosts 104 having a common domain name and/or IP address but different geographic-based codes also are disregarded (e.g., removed from the database, list, table, or other memory structure of landmark Internet hosts 104).

On the other hand, if the geographic-based codes do not match and/or there are not multiple landmark Internet hosts 104 (shown in FIG. 1) having the same or common domain names and/or IP addresses, then the different geographic-based codes and/or the different domain names and/or IP addresses may indicate that the landmark Internet hosts 104 are not associated with the same entity and/or are not located at the same geographic location (e.g., the same ZIP code or postal address). As a result, flow of the method 900 continues to 912.

At 912, a derived geographic location of the landmark Internet host 104 (show in FIG. 1) is determined and compared to the reported location of the landmark Internet host 104. For example, as described above, a derived geographic location of the target Internet host 102 (shown in FIG. 1) can be determined based on relative distances between the target Internet host 102 and one or more landmark Internet hosts 104 having known and/or verified geographic locations. In a similar manner, a derived geographic location of the examined landmark Internet host 104 is determined. As described above, probe packets can be transmitted to the reported location of the examined landmark Internet host 104 and to other landmark Internet hosts 104 having known locations. Based on the network latencies associated with the probe packets, one or more relative distances between the examined landmark Internet host 104 and one or more of the other landmark Internet hosts 104 is determined. The relative distances can be used to determine the derived geographic location of the examined landmark Internet host 104, as described above in connection with the target Internet host 102.

The derived geographic location is compared to the reported location to determine if the derived geographic location is relatively close to the reported location. For example, if the derived geographic location and the reported location differ by at least a predetermined amount (e.g., at least 0.5 kilometers or 0.31 miles, at least 1 kilometer or 0.62 miles, at least 1.5 kilometers or 0.93 miles, or at least another distance), then the difference between the derived geographic location and the reported location may indicate that the examined landmark Internet host 104 is not located at the reported location. As a result, flow of the method 900 may flow to 906 where the examined landmark Internet host 104 is disregarded as a landmark Internet host 104. On the other hand, if the derived geographic location and the reported location differ by no more than the predetermined amount, then the relatively small difference between the derived geographic location and the reported location may indicate that the examined landmark Internet host 104 (shown in FIG. 1) is located at or near the reported location. As a result, flow of the method 900 may flow to 914.

At 914, the reported location of the landmark Internet host 104 (shown in FIG. 1) is verified as being the actual location of the landmark Internet host 104. For example, identifying information about the landmark Internet host 104 (e.g., the domain name and/or IP address of the website hosted by the landmark Internet host 104) and the reported location may be recorded in a database, table, list, or other memory structure. The landmark Internet host 104 can then be used to determine derived geographic locations of target Internet hosts 102 (shown in FIG. 1), as described above.

In one embodiment, the geographic location of a landmark Internet host 104 (shown in FIG. 1) can be checked for accuracy. For example, the derived geographic location of a landmark Internet host 104 can be determined and compared to the reported or recorded location of the landmark Internet host 104 as a "self-healing" mechanism of one or more embodiments of the system and method described herein. For example, a reported location of a landmark Internet host 104 or a location of a landmark Internet host 104 that has been verified as the actual location of the landmark Internet host 104 may be periodically checked for accuracy. A previously verified location of the landmark Internet host 104 may be periodically checked to ensure that the entity using the landmark Internet host 104 as a host for one or more web-related services has not moved the landmark Internet host 104 or started using another landmark Internet host 104 in another geographic location.

The reported or previously verified location can be checked by determining a derived geographic location of the landmark Internet host 104 (shown in FIG. 1) and comparing the derived geographic location to the reported or previously verified location, as described above. For example, a landmark Internet host 104 having a reported or previously verified location that is being checked for accuracy may be treated as the target Internet host 102 (shown in FIG. 1) in the method 200 (shown in FIG. 2) such that a derived geographic location for the landmark Internet host 104 is determined. This derived geographic location can be compared to the reported or previously verified location to determine if the reported or previously verified location is accurate, as described above. The landmark Internet hosts 104 having reported or previously verified locations that are no longer accurate may be disregarded and no longer used for determining derived geographic locations of target Internet hosts 102.

In one embodiment, if the derived geographic location for a target Internet host 102 is repeatedly determined to be the same derived geographic location, then the target Internet host 102 may be used as a landmark Internet host 104 for other target Internet hosts 102. For example, if the derived geographic location for a particular target Internet host 102 is the same or does not vary by more than a predetermined amount over the course of a week, month, year, or longer time period, then the target Internet host 102 may be used as a landmark Internet host 104.

Figure 12:
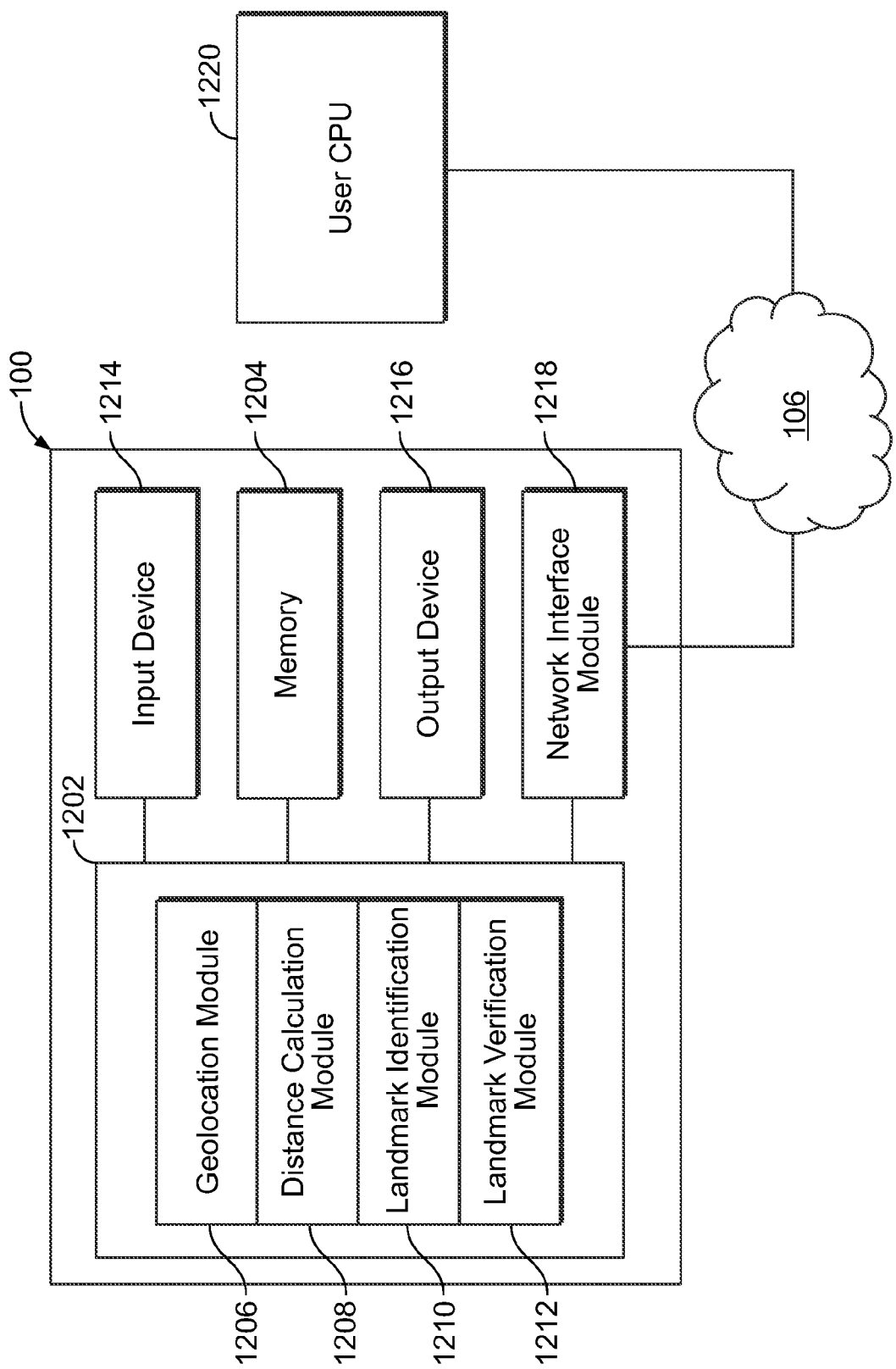
FIG. 12 is an illustration of one embodiment of the geographic location system.

FIG. 12 is an illustration of one embodiment of a geographic location system 100. The system 100 may be used in conjunction with one or more of the methods 200 and/or 900 (shown in FIGS. 2 and 9). The system 100 includes a programmable processor 1202, such as one or more computer processors, microprocessors, controllers, microcontrollers, or other processing units. The processor 1202 includes a computer processor, or equivalent control circuitry, and may further include RAM or ROM memory, logic and timing circuitry, state machine circuitry, and I/O circuitry. The processor 1202 may include one or more modules and/or other processors configured to perform one or more of the operations described herein. For example, a tangible and non-transitory computer readable storage medium, such as a memory 1204, may include one or more sets of instructions that direct the processor 1202 to carry out one or more operations. These sets of instructions may be performed as different modules of the processor 1202. In one embodiment, the memory 1204 includes a computer hard disk, floppy disc, RAM, ROM, EEPROM, flash drive, DVD, CD, or other computer-readable storage medium. Alternatively, the modules may represent different memories that include software applications and/or different processors.

A geolocation module 1206 identifies the area of interest 300 (shown in FIG. 3) and/or the reduced area of interest 802 (shown in FIG. 8), as described above. The geolocation module 1206 may access one or more maps and/or databases, lists, tables, or other memory structures stored on the memory 1204 for determining geographic-based codes, maps, landmark Internet hosts 104 (shown in FIG. 1), locations of the landmark Internet hosts 104, and the like, as are needed to determine the areas of interest 300, 802. In one embodiment, the geolocation module 1206 directs one or more computers, such as the ping servers 302 (shown in FIG. 3), to transmit the probe packets (e.g., ping packets) to the target Internet host 102, as described above.

A distance calculation module 1208 identifies network pathways in the network 106 and measures network latencies associated with the transmission of data packets on the network pathways. As described above, the network pathways and the network latencies may be used in the determination of the area of interest 300 and/or 802 (shown in FIGS. 3 and 8), in the identification of common nodes in the network 106, in the calculation of relative distances between one or more landmark Internet hosts 104 (shown in FIG. 1) and the target Internet host 102 (shown in FIG. 1), in calculating the derived geographic location of the target Internet host 102, and the like. In one embodiment, the distance calculation module 1208 directs the vantage points ($V_1$, $V_2$) shown in FIG. 6 to transmit probe packets to the landmark Internet hosts 104 and/or the target Internet host 102, such as data packets used by a traceroute software application or tool that is stored on the memory 1204. For example, the distance calculation module 1208 can direct computers located at the vantage points ($V_1$, $V_2$) to transmit probe packets, as described above. The distance calculation module 1208 may calculate relative distances between the target Internet host 102 and one or more of the landmark Internet hosts 104 and/or relative distances between two or more landmark Internet hosts 104.

A landmark identification module 1210 selects one or more of the landmark Internet hosts 104 (shown in FIG. 1) in the area of interest 300 and/or 802 (shown in FIGS. 3 and 8) that are to be used in the determination of relative distances between the target Internet host 102 (shown in FIG. 1) and one or more of the landmark Internet hosts 104. As described above, the landmark identification module 1210 may select the landmark Internet hosts 104 from a database, table, list, or other memory structure that is stored on the memory 1204, or may search for the landmark Internet hosts 104 from search engines on the network 106. The landmark identification module 1210 compares relative distances between the target Internet host 102 and each of a plurality of landmark Internet hosts 104 to determine which landmark Internet hosts 104 may be geographically closer to the target Internet host 102, as described above. In one embodiment, the geolocation module 1206 uses the relative distances determined by the landmark identification module 1210 to determine the derived geographic location of the target Internet host 102.

A landmark verification module 1210 verifies the reported locations of landmark Internet hosts 104 (shown in FIG. 1). For example, the landmark verification module 1210 may examine a reported location of a landmark Internet host 104 to determine if the reported location is accurate and/or corresponds to a previously verified location of the landmark Internet host 104, as described above.

The processor 1202 is communicatively coupled with an input device 1214, the memory 1204, an output device 1216, and a network interface module 1218 by one or more wired and/or wireless connections. For example, conductive busses, wires, wireless connections, and the like may permit communication of data between the processor 1202 and the other components of the system 100. The input device 1214 may include one or more electronic components capable of receiving input from an operator of the system 100. For example, the input device 1214 may include a keyboard, touchscreen, stylus, electronic mouse, microphone, and the like. The output device 1216 may include one or more electronic components capable of providing output from the processor 1202 to the operator. For example, the output device 1216 may include a computer monitor, touchscreen (e.g., both the input and output devices 1214, 1216 may be a single device), speaker, and the like.

The network interface module 1218 includes one or more transceivers, transmitters, receivers, modems, and the like, that enable data communication between the system 100 and the network 106, and one or more user computers 1220 via the network 106. For example, the network interface module 1218 may transmit directions from the processor 1202 to various vantage points, nodes, computers, and the like, that are connected to the network 106 in connection with the methods 200 and/or 900 described above.

The user computer 1220 is a computing device, such as a personal laptop or desktop computer, that is employed by a user to interface with the system 100. For example, a user can employ the user computer 1220 to geolocate the target Internet host 102 (shown in FIG. 1), as described above. The user computer 1220 can access a webpage or other software tool to interface with the system 100 and geolocate target Internet hosts 102.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to one of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments disclosed herein, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the disclosed subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the subject matter herein involved, it is intended that all of the subject matter of the above description or shown in the accompanying drawings shall be interpreted merely as examples illustrating the inventive concepts herein and shall not be construed as limiting the disclosed subject matter.

What is claimed is:

1. A method for determining a derived geographic location of a target Internet host, the method including:
    identifying plural landmark Internet hosts communicatively coupled with each other and with the target Internet host by a packet-switched network;
    identifying a geographic area of interest that includes the landmark Internet hosts;
    determining the landmark Internet hosts by searching for one or more entities having the landmark Internet hosts and geographic locations located within the area of interest;
    verifying that one or more of an Internet Protocol (IP) address or a domain name of a website or an email exchange server for each of the landmark Internet hosts is associated with one or more computers disposed at the landmark geographic location of the landmark Internet host;
    sending first probe packets to the target Internet host and to each of the landmark Internet hosts from plural vantage points;
    measuring first network latencies of the first probe packets transmitted to the target Internet host and to each of the landmark Internet hosts along different network pathways in the network;
    calculating relative distances between the target Internet host and one or more of the landmark Internet hosts based on the first network latencies;
    comparing the relative distances;
    determining the landmark Internet host that has a smallest relative distance from the target Internet host;
    obtaining a geographic location of the landmark Internet host that has the smallest relative distance from the target Internet host; and
    determining the derived geographic location of the target Internet host:
        without at least one of receiving an actual geographic location of the target Internet host from a third party or having administrative access to the target Internet host and at least one of the landmark Internet hosts, and
        by setting the derived geographic location to the geographic location of the landmark Internet host that has the smallest relative distance from the target Internet host; and
    wherein measuring the first network latencies includes:
        identifying at least one common node in the network that is disposed along each of a first network pathway that extends from a first vantage point of the plural vantage points to the target Internet host and a second network pathway that extends from the same first vantage point to one of the landmark Internet hosts;
        determining a network latency of a first leg of the first network pathway between the at least one common node and the target Internet host;
        determining a network latency of a second leg of the second network pathway between the at least one common node and the one of the landmark Internet hosts; and
        calculating a derived network latency for a derived network pathway by summing the network latencies of the first and second legs, wherein the derived network pathway extends from the one of the landmark Internet hosts to the target Internet host via the at least one common node, wherein the relative distance of the one of the landmark Internet hosts is based on the derived network latency.

2. The method of claim 1, further comprising identifying a geographic area of interest that includes the landmark Internet hosts, measuring the first network latencies between the landmark Internet hosts in the area of interest and the target Internet host, and reducing a geographic size of the area of interest to a reduced area of interest based on at least the derived network latency of the one of the landmark Internet hosts, wherein the landmark Internet host that is geographically closer to the target Internet host is disposed within the reduced area of interest.

* * * * *